(12) United States Patent
Lee et al.

(10) Patent No.: US 11,506,574 B2
(45) Date of Patent: Nov. 22, 2022

(54) METHODS AND APPARATUSES FOR DIAGNOSING HEALTH STATE OF THREE-DIMENSIONAL PRINTER

(71) Applicant: Research & Business Foundation Sungkyunkwan University, Suwon-si (KR)

(72) Inventors: Sang Won Lee, Suwon-si (KR); Jung Sub Kim, Suwon-si (KR); Chang Su Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1017 days.

(21) Appl. No.: 16/214,536

(22) Filed: Dec. 10, 2018

(65) Prior Publication Data

US 2019/0178755 A1    Jun. 13, 2019

(30) Foreign Application Priority Data

Dec. 8, 2017   (KR) .......................... 10-2017-0168652

(51) Int. Cl.
  *G01M 99/00*      (2011.01)
  *B33Y 10/00*      (2015.01)
  (Continued)

(52) U.S. Cl.
  CPC ......... *G01M 99/005* (2013.01); *B29C 64/386* (2017.08); *B33Y 10/00* (2014.12); *B33Y 30/00* (2014.12); *B33Y 50/00* (2014.12)

(58) Field of Classification Search
  CPC ......... B33Y 10/00; B33Y 30/00; B33Y 50/00; B29C 64/386; B29C 64/393
  See application file for complete search history.

(56) References Cited

U.S. PATENT DOCUMENTS

| | | | |
|---|---|---|---|
| 10,889,068 B1* | 1/2021 | Batchelder | B33Y 30/00 |
| 2005/0104241 A1* | 5/2005 | Kritchman | B33Y 10/00 |
| | | | 425/375 |
| 2016/0236418 A1* | 8/2016 | Armani | G05B 19/402 |

FOREIGN PATENT DOCUMENTS

| | | |
|---|---|---|
| KR | 10-2015-0026416 A | 3/2015 |
| KR | 10-2015-0099026 | 8/2015 |
| WO | WO 2016/032075 A1 | 3/2016 |

OTHER PUBLICATIONS

Kim J. S., et al., "A Study on Fused Deposition Modeling (FDM) Process Condition Monitoring Using Acceleration Signals", *The 2017 Spring Conference of the Korean Society of Manufacturing Technology Engineers*, 2017, pp. 145-145 (2 pages in English, 2 pages in Korean).

(Continued)

*Primary Examiner* — Lam S Nguyen
(74) *Attorney, Agent, or Firm* — NSIP Law

(57) ABSTRACT

Some embodiments of the present invention intend to provide a method and an apparatus for diagnosing health state of a 3D printer which collects collection data in a 3D printing process by using sensors attached to the 3D printer (for example, an acceleration sensor and an acoustic emission sensor), extracts feature elements of the sensor data, applies machine learning to an equipment health state diagnosis model based on the extracted feature elements, and thereby enables diagnosing equipment health state of 3D printer components in an objective and consistent manner.

20 Claims, 45 Drawing Sheets

(51) Int. Cl.
*B33Y 50/00* (2015.01)
*B29C 64/386* (2017.01)
*B33Y 30/00* (2015.01)

(56) References Cited

OTHER PUBLICATIONS

Korean Office Action dated Apr. 4, 2019 in corresponding Korean Patent Application No. 10-2017-0168652 (7 pages in Korean).

* cited by examiner

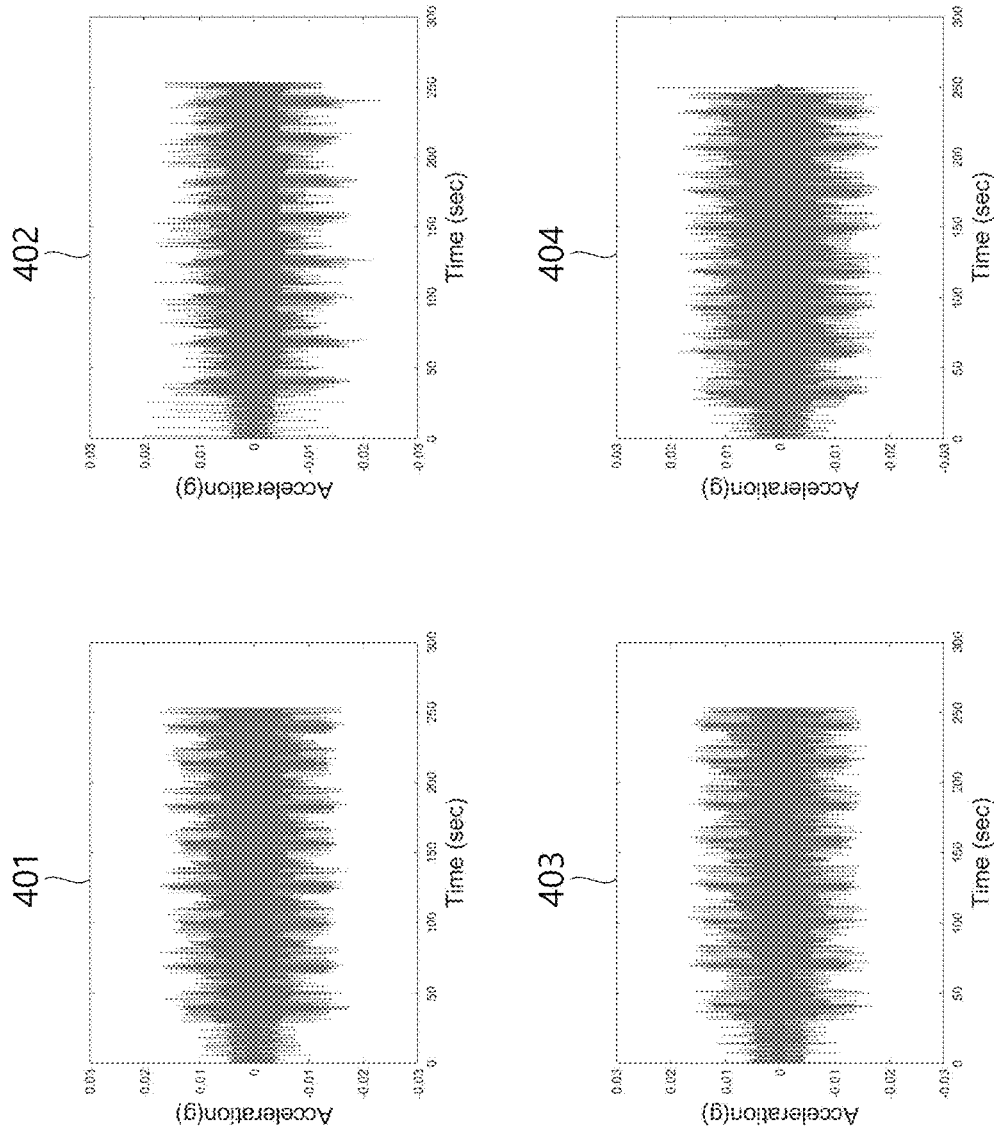

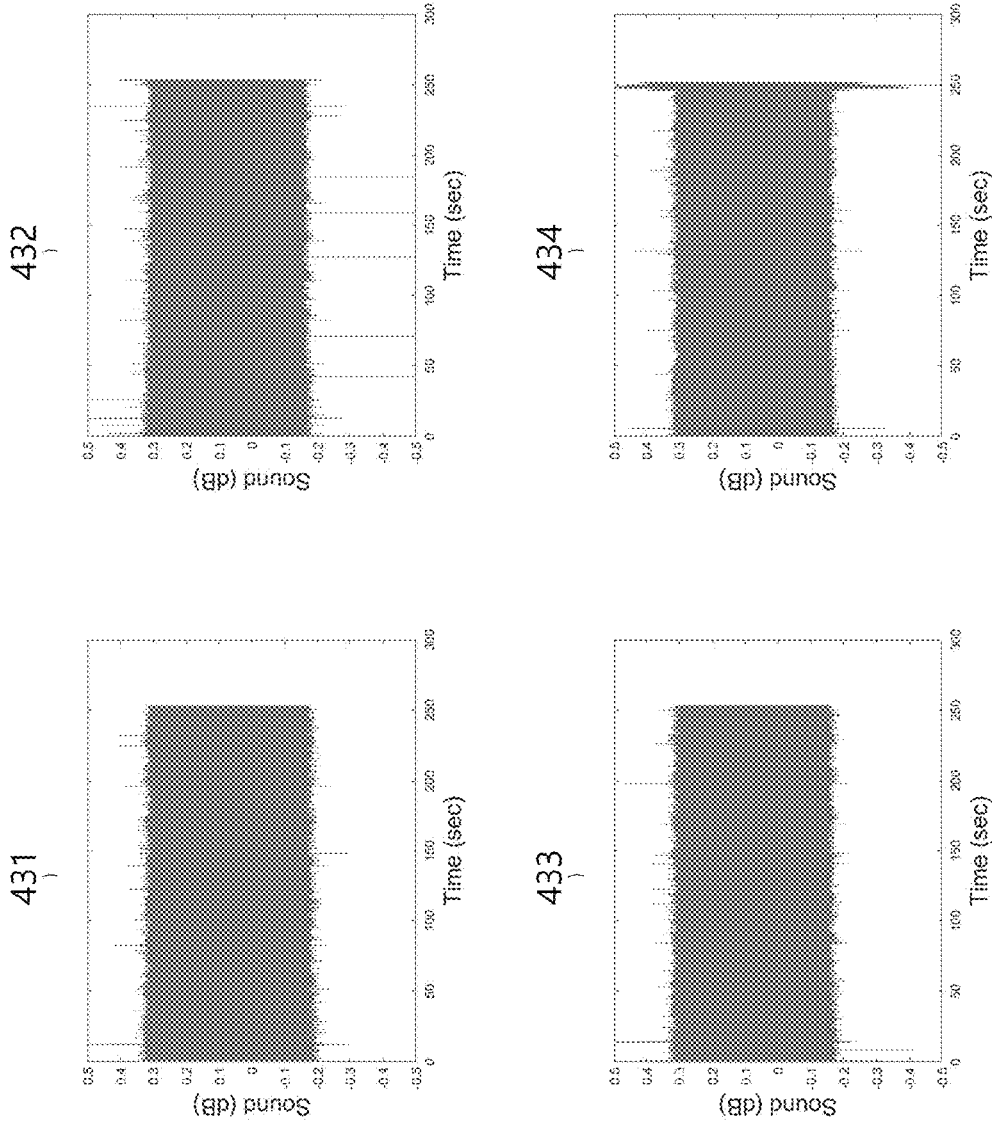

METHODS AND APPARATUSES FOR DIAGNOSING HEALTH STATE OF THREE-DIMENSIONAL PRINTER

CROSS-REFERENCE TO RELATED APPLICATIONS

This application claims benefit of priority to Korean Patent Application No. 10-2017-0168652 filed on 8 Dec. 2017 in the Korean Intellectual Property Office, the disclosure of which is incorporated herein by reference in its entirety.

BACKGROUND

Technical Field

The present invention relates to methods for diagnosing a three-dimensional (3D) printer and, more particularly, to methods and apparatuses for diagnosing health state of a 3D printer.

Description of Related Art

Conventional methods for producing a prototype having a 3D shape include a mock-up production method using CAD-based manual crafting and a Computerized Numerical Control (CNC) milling-based production method. However, a mock-up production method relies on manual crafting, which makes it difficult to achieve precise numerical control and requires a large amount of time to complete the production. CNC milling-based production is suitable for precise numerical control, but shapes that may be produced are limited due to tool interference.

To overcome the drawbacks of the conventional methods, a so-called 3D printing method has emerged, by which a prototype having a 3D shape is produced using a computer storing 3D modeling data generated by the designer of the corresponding product in a layer-by-layer fashion. The 3D printing technology, which is intended for generating a 3D shape of a target object easily and with low costs at the time of producing a prototype in the development stage or for a production system of multiple types in small quantities, is receiving great attention. 3D printing is an additive manufacturing (AM) technology which creates a 3D object, by analyzing the 3D shape of an object by using a 3D graphic design program and constructing the 3D shape of the object by using a combination of 2D cross-sectional data; and by forming raw materials of thermoplastic resin such as Acrylonitrile Butadiene Styrene (ABS) or PolyLactic Acid (PLA) on an output bed in various ways according to the 2D cross-sectional data information.

3D printing methods include a StereoLithographic Apparatus (SLA) method based on the principle that if a laser beam is applied to photopolymer resin, the laser-beam applied portion is hardened; Selective Laser Sintering (SLS) method based on the principle that a laser beam is applied to a functional polymer or metallic powder instead of the photopolymer resin used in the SLA method, and the laser-beam applied portion is molded by solidification; Laminated Object Manufacturing (LOM) method which cuts adhesive-coated paper laminates into desired cross-sections by using a laser-beam and forms a desired shape by laminating layers; Ballistic Particle Manufacturing (BPM) method which utilizes the Ink-Jet printer technology; and Fused Deposition Modeling (FDM) method in which a heated nozzle melts thermoplastic materials and forms a 3D shape by depositing the molten thermoplastic materials layer after layer. In the FDM method, which is one type of 3D printing techniques, a raw material is forced out to the output bed to construct a 3D shape by being deposited on a growing workpiece sequentially. The FDM method is also referred to as a Fused Filament Fabrication (FFF) method.

A 3D printer based on the FDM or FFF technique, which is a conventional deposition-based fabrication method, forces the raw material, thermoplastic resin, to the output nozzle unit in the form of a filament. And a supply roller within the output nozzle unit rotates to feed the raw material to a heater. The fed raw material melts in the heater and develops viscosity; the melted raw material is injected from the nozzle and deposited on the output bed.

SUMMARY

A 3D printer may suffer a failure from various components such as a belt, bolt, or plate. When a failure occurs, an operator usually checks the external shape of an output object by visual inspection and stops the 3D printing process depending on the inspection result or diagnoses the equipment offline after the 3D printing process by checking internal and external quality defects using measurement equipment. However, if determination of the cause of the failure relies on the operator's experience, it becomes difficult to diagnose the equipment health in an objective and consistent manner. Also, novices to a 3D printing technique have to build up their own experiences from the start. Moreover, when the failure diagnosis is carried out by using measurement equipment after the 3D printing process, a considerable waste of time and materials is incurred due to the stop of the process, causing a large problem in terms of efficiency of the entire process.

Some embodiments of the present invention intend to provide a method and an apparatus for diagnosing health state of a 3D printer which collects collection data in a 3D printing process by using sensors attached to the 3D printer (for example, an acceleration sensor and an acoustic emission sensor), extracts feature elements of the sensor data, applies machine learning to an equipment health diagnosis model based on the extracted feature elements, and thereby enables diagnosing equipment health state of 3D printer components in an objective and consistent manner.

Some embodiments of the present invention intend to provide a method and an apparatus for diagnosing health state of a 3D printer capable of accurately diagnosing and predicting a failure of major components of a 3D printer based on a health diagnosis result of the 3D printer.

According to one example embodiment of the present invention, a method for diagnosing health state of a 3D printer may be provided, the method comprising collecting at least one of acceleration data and sound data due to a movement of a 3D printer component during a 3D printing process as collection data through at least one of at least one acceleration sensor and an acoustic emission sensor attached to the 3D printer; extracting at least one feature element among feature elements of the acceleration data and feature elements of the sound data for determining a normal state and an abnormal state of the 3D printer component by using at least one of the acceleration data and the sound data; and diagnosing health state of the 3D printer component by analyzing a correlation between at least one of the feature elements of the acceleration data and the feature elements of the sound data and an abnormal state of the 3D printer component by using machine learning.

The 3D printer component may include at least one of a plate, belt, and bolt of the 3D printer.

The at least one acceleration sensor may include at least one acceleration sensor among an X-axis acceleration sensor, Y-axis acceleration sensor, and Z-axis acceleration sensor.

The feature element of the acceleration data may include a feature element of at least one acceleration data among a feature element of X-axis acceleration data, feature element of Y-axis acceleration data, and feature element of Z-axis acceleration data.

The method may further comprise defining at least one acceleration data among a feature element of X-axis acceleration data, feature element of Y-axis acceleration data, and feature element of Z-axis acceleration data into a case of a normal state and a case of an abnormal state of the 3D printer component.

The abnormal state may include at least one abnormal state among a loose belt, loosened bolt, and tilted plate.

The feature element may include at least one of root mean square (RMS), maximum, crest factor, variance, kurtosis, and skewness feature element.

The collecting at least one as collection data may collect collection data by using wireless communication with at least one of at least one acceleration sensor and an acoustic emission sensor attached to the 3D printer.

The extracting at least one feature element may extract at least one feature element between the feature element of the acceleration data and the feature element of the sound data by dividing collection data corresponding to a deposition layer number of an output object of the 3D printer according to the respective layers.

The method may further comprise predicting a failure of the 3D printer component by using a health diagnosis result of the 3D printer component.

Meanwhile, according to another embodiment of the present invention, an apparatus for diagnosing health state of a 3D printer may be provided, the apparatus comprising a data collecting unit collecting at least one of acceleration data and sound data due to a movement of a 3D printer component during a 3D printing process as collection data through at least one of at least one acceleration sensor and an acoustic emission sensor attached to the 3D printer; a feature element extracting unit extracting at least one feature element among feature elements of the acceleration data and feature elements of the sound data for determining a normal state and an abnormal state of the 3D printer component by using at least one of the acceleration data and the sound data; and a health state diagnosing unit diagnosing health state of the 3D printer component by analyzing a correlation between at least one of the feature elements of the acceleration data and the feature elements of the sound data and an abnormal state of the 3D printer component by using machine learning.

The 3D printer component may include at least one of a plate, belt, and bolt of the 3D printer.

The at least one acceleration sensor may include at least one acceleration sensor among an X-axis acceleration sensor, Y-axis acceleration sensor, and Z-axis acceleration sensor.

The feature element of the acceleration data may include a feature element of at least one acceleration data among a feature element of X-axis acceleration data, feature element of Y-axis acceleration data, and feature element of Z-axis acceleration data.

The apparatus may further comprise defining at least one acceleration data among a feature element of X-axis acceleration data, feature element of Y-axis acceleration data, and feature element of Z-axis acceleration data into a case of a normal state and a case of an abnormal state of the 3D printer component.

The abnormal state may include at least one abnormal state among a loose belt, loosened bolt, and tilted plate.

The feature element may include at least one or more of root mean square (RMS), maximum, crest factor, variance, kurtosis, and skewness feature element.

The data collecting unit may collect collection data by using wireless communication with at least one of at least one acceleration sensor and an acoustic emission sensor attached to the 3D printer.

The feature element extracting unit may extract at least one feature element between the feature element of the acceleration data and the feature element of the sound data by dividing collection data corresponding to a deposition layer number of an output object of the 3D printer according to the respective layers.

The health state diagnosing unit may predict a failure of the 3D printer component by using a health state diagnosis result of the 3D printer component.

BRIEF DESCRIPTION OF THE DRAWINGS

FIGS. 4A to 4D illustrate collection data collected about a normal and a failure state of a 3D printer according to one example embodiment of the present invention.

DETAILED DESCRIPTION OF EXAMPLE EMBODIMENTS OF THE INVENTION

Figure 1:
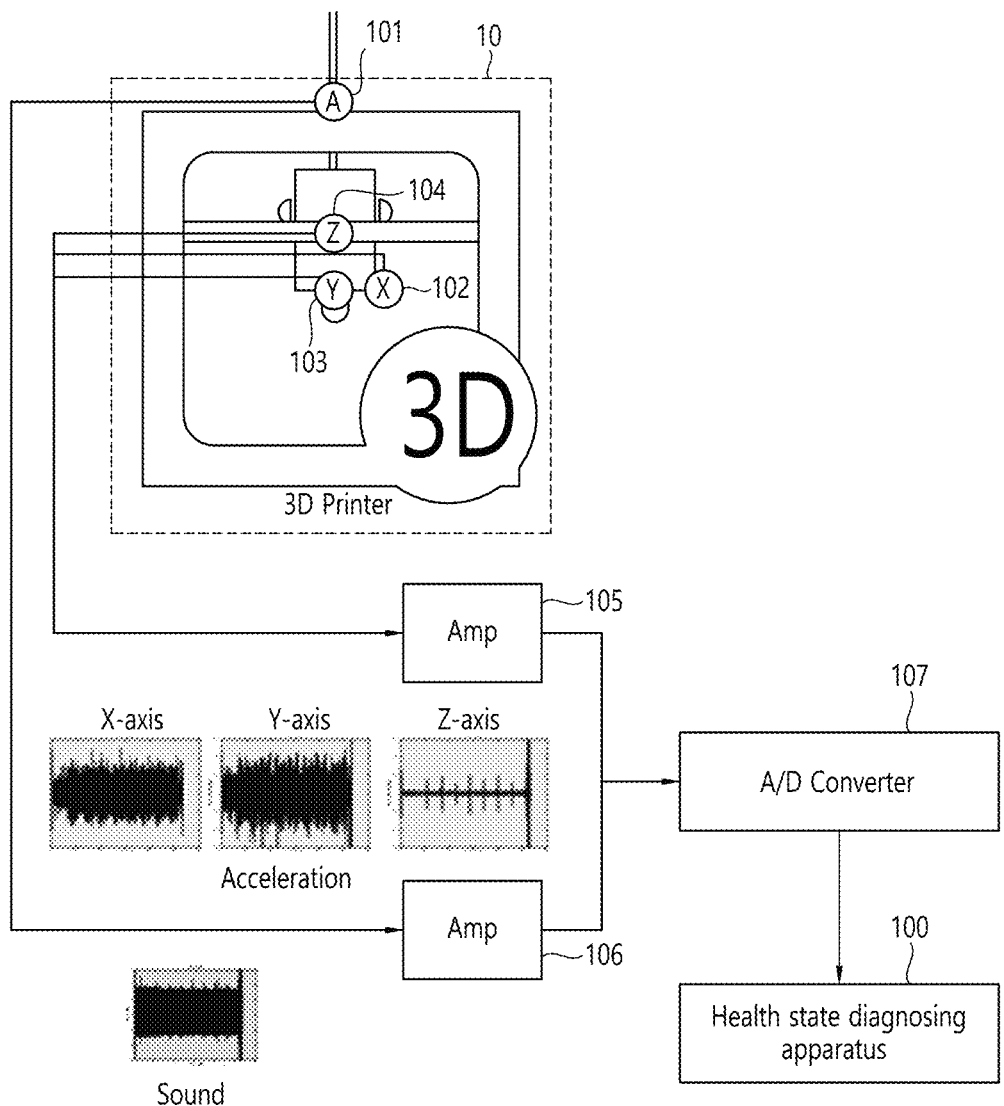
FIG. 1 illustrates an apparatus for diagnosing health state of a 3D printer according to one example embodiment of the present invention.

Since the present invention may be modified in various ways and may provide various embodiments, specific embodiments will be depicted in the appended drawings and described in detail with reference to the drawings.

However, it should be understood that the specific embodiments are not intended to restrict the gist of the present invention to the specific embodiments; rather, it should be understood that the specific embodiments include all of the modifications, equivalents or substitutes described by the technical principles and belonging to the technical scope of the present invention.

The terms such as first and second are introduced to describe various elements, but the elements should not be limited by the terms. The terms are used only for the purpose of distinguishing one from the other elements. For example, a first element may be called a second element without leaving the technical scope of the present invention, and similarly, the second element may be called the first element. The term and/or includes any one of a combination of a plurality of related disclosed elements or a plurality of related disclosed elements.

If an element is said to be "connected" or "attached" to other element, the former may be connected or attached directly to the other element, but there may be a case in which another element is present between the two elements. On the other hand, if an element is said to be "directly connected" or "directly attached" to other element, it should be understood that there is no other element between the two elements.

Terms used in this document are intended only for describing a specific embodiment and are not intended to limit the technical scope of the present invention. A singular expression should be understood to indicate a plural expression unless otherwise explicitly stated. The term of "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all of the terms used in this document, including technical or scientific terms, provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

In what follows, with reference to appended drawings, preferred embodiments of the present invention will be described in more detail. In describing the present invention, to help overall understanding, the same reference symbols are used for the same elements in the drawings, and repeated descriptions of the same elements will be omitted.

FIG. 1 illustrates an apparatus for diagnosing health state of a 3D printer according to one example embodiment of the present invention.

As shown in FIG. 1, an apparatus for diagnosing health state according to one example embodiment of the present invention diagnoses health state of 3D printer components by collecting at least one of acceleration data and sound data collected through at least one of at least one acceleration sensor 102, 103, 104 and an acoustic emission sensor 101 attached to a 3D printer 10 as collection data.

First, a 3D printer 10 employing the FDM technique used in one example embodiment of the present invention will be described. A filament, which is used as a raw material for an FDM-based 3D printer, is wound around a spool by processing a heat-melting substance into the form of a thin thread. An FDM-based 3D printer comprises a feeder that moves the filament; a carrier which is equipped with a nozzle for melting and injecting the filament and moves the nozzle to a printing position; and a bed which deposits an output object and moves a printing position. The filament wound around the spool is moved continuously through the feeder and injected into the nozzle. The filament injected to the nozzle melts into a liquid state by the heat generated by the nozzle and is extruded out of the nozzle and deposited on the bed where an output work is growing. The extruded filament in the liquid state forms an image according to the movement of the carrier and the bed, and as a result, a 3D output work is produced.

The FDM-based 3D printer 10 is composed of X-axis, Y-axis, and Z-axis driving units. The X-, Y-, and Z-axis driving units deliver driving power generated by the motor to the carrier and the bed to move the heater nozzle to the corresponding printing position. To implement the aforementioned movement, components of the 3D printer 10 may include at least one component from among the belt, bolt, and plate.

The apparatus for diagnosing health state of a 3D printer according to one example embodiment of the present invention collects collection data by using various sensors attached to the 3D printer 10 and extracts feature elements of sensor data. For example, the 3D printer 10 may be equipped with acceleration sensors along individual axes, including an X-axis acceleration sensor 102, Y-axis acceleration sensor 103, and Z-axis acceleration sensor 104, or an acoustic emission sensor 101. And the health state diagnosing apparatus 100 may diagnose equipment health state of 3D printer components in an objective and consistent manner by using an equipment health state diagnosis model to which machine learning based on the extracted feature elements has been applied.

As a modified embodiment, an health state diagnosing apparatus 100 of a 3D printer according to one example embodiment of the present invention may comprise two first and second amplifiers 105, 105 and an analog/digital (A/D) converter 107. The first amplifier 105 is connected to the X-axis acceleration sensor 102, Y-axis acceleration sensor 103, and Z-axis acceleration sensor 104; and amplifies an acceleration data signal of each axis measured by the acceleration sensor of the corresponding axis. Also, the second amplifier 106 is connected to the acoustic emission sensor 101 and amplifies an acoustic emission data signal measured by the acoustic emission sensor 101. And the A/D converter 107 is connected to the first and second amplifiers 105, 106 and the A/D converter 107; and converts an amplified analog signal to a digital signal and delivers the digital signal to the health state diagnosing apparatus 100.

Through the operation above, by using collection data collected through at least one sensor (101 to 104), the health state diagnosing apparatus 100 of a 3D printer according to one example embodiment of the present invention may monitor the 3D printing process based on extrusion-deposition fabrication and construct a health state diagnosis model for major components of a 3D printer to which machine learning has been applied. The health state diagnosing apparatus 100 of a 3D printer diagnoses health state correctly based on the constructed health state diagnosis model, thereby providing an apparatus for diagnosing health state of equipment robustly and online, which does not depend on subjective experience of a worker and offline measurement after the fabrication process is stopped.

Figure 2:
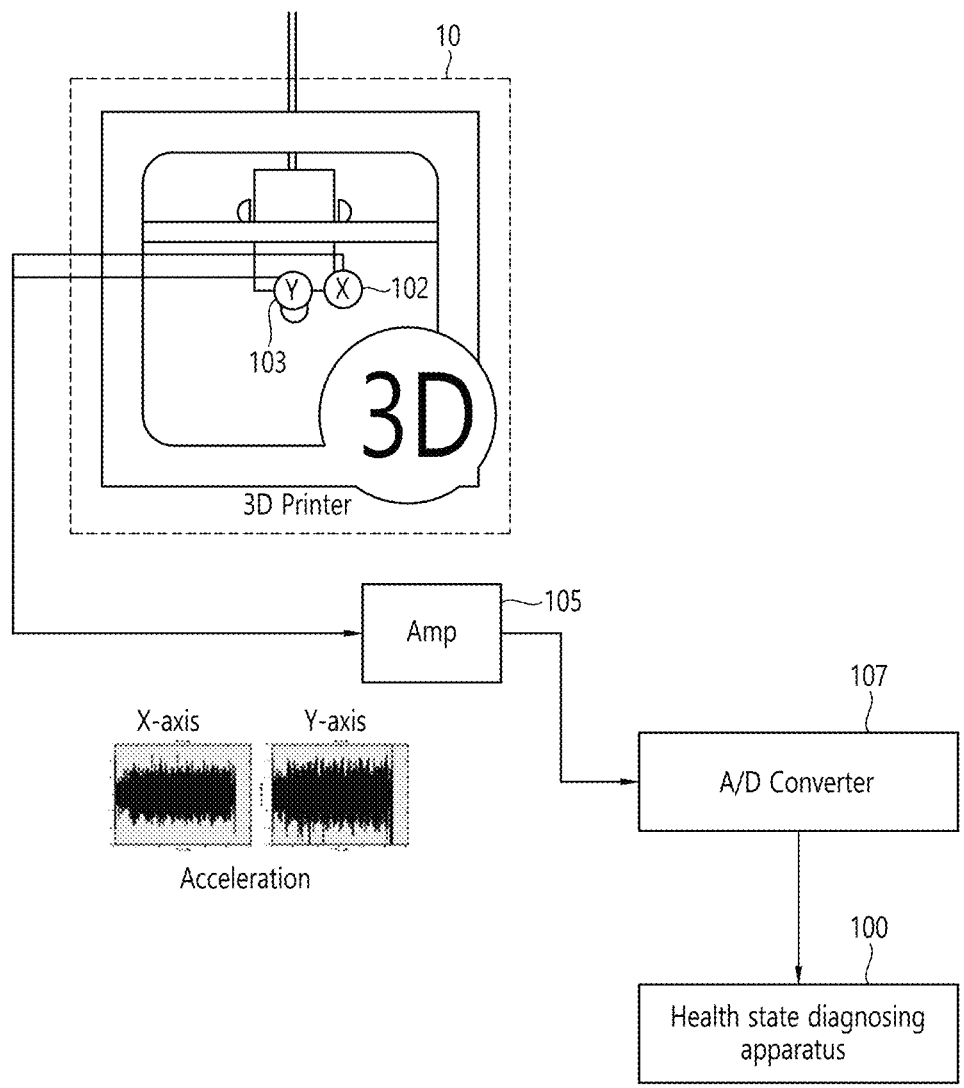
FIG. 2 illustrates an apparatus for diagnosing health state of a 3D printer according to another embodiment of the present invention.

FIG. 2 illustrates an apparatus for diagnosing health state of a 3D printer according to another embodiment of the present invention.

The health state diagnosis apparatus shown in FIG. 1 attaches an X-axis acceleration sensor 102, Y-axis acceleration sensor 103, Z-axis acceleration sensor 104, and acoustic emission sensor 101 to the 3D printer 10 to collect the respective collection data.

Differently from the above, the health state diagnosing apparatus 100 of a 3D printer according to another embodiment of the present invention shown in FIG. 2 attaches the X-axis acceleration sensor 102 and the Y-axis acceleration sensor 103 to the 3D printer 10; and collects acceleration data collected through at least one of the X-axis acceleration sensor 102 and the Y-axis acceleration sensor 103 as collection data. In other words, the health state diagnosing apparatus 100 of a 3D printer according to another embodiment of the present invention, differently from FIG. 1, collects collection data through the two X-axis 102 and Y-axis acceleration sensors 103 excluding the Z-axis acceleration sensor 104 and the acoustic emission sensor 101.

The health state diagnosing apparatus 100 of a 3D printer according to another embodiment of the present invention collects collection data by using the X-axis acceleration sensor 102 and the Y-axis acceleration sensor 103 attached to the 3D printer; and extracts feature elements of the respective sensor data. And the health state diagnosis apparatus 100 may diagnose equipment health state of 3D printer components in an objective and consistent manner by using an equipment health state diagnosis model to which machine learning has been applied based on the X-axis acceleration feature elements and Y-axis acceleration feature elements extracted from the X-axis acceleration data and the Y-axis acceleration data.

As a modification, the health state diagnosing apparatus 100 of a 3D printer according to one example embodiment of the present invention may comprise one first amplifier 105 and an A/D converter 107. The first amplifier 105 is connected to the X-axis acceleration sensor 102 and the Y-axis acceleration sensor 103; and amplifies an acceleration data signal of each axis measured by the acceleration sensor with respect to each axis. And the A/D converter 107 is connected to the first amplifier 105, converts an amplified analog signal into a digital signal, and delivers the digital signal to the health state diagnosis apparatus 100.

Figure 3:
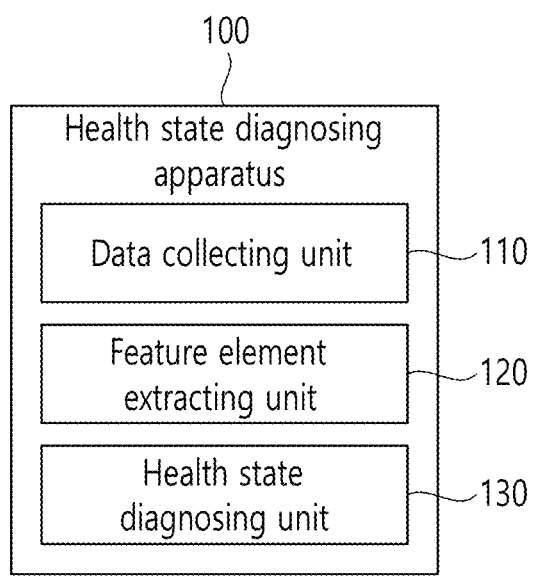
FIG. 3 illustrates a structure of an apparatus for diagnosing health state of a 3D printer according to one example embodiment of the present invention.

FIG. 3 illustrates a structure of an apparatus for diagnosing health state of a 3D printer according to one example embodiment of the present invention.

As shown in FIG. 3, the health state diagnosing apparatus 100 of a 3D printer according to one example embodiment of the present invention comprises a data collecting unit 110, feature element extracting unit 120, and health state diagnosing unit 130. However, it should be noted that all of the depicted elements are not necessarily essential elements. The health state diagnosing apparatus 100 of a 3D printer may be implemented by a larger number of elements than shown in the figure, and similarly, the health state diagnosing apparatus 100 of a 3D printer may also be implemented by a smaller number of elements than shown in the figure.

In what follows, a specific structure and operation of each component of an apparatus for diagnosing health state of a 3D printer according to one example embodiment of the present invention will be described.

The data collecting unit 110 collects at least one of acceleration data due to a movement of a 3D printer component during the 3D printing process and sound data as collection data through at least one of at least one acceleration sensor (102 to 104) and an acoustic emission sensor 101 attached to the 3D printer. The data collection unit 110 may collect collection data by using wireless communication with at least one of at least one acceleration sensor and acoustic emission sensor attached to the 3D printer 10. As described above, collecting collection data by using wireless communication is aimed for diagnosing health state of 3D printer components remotely by the apparatus for diagnosing health state of a 3D printer. As one example, the data collecting unit 110 may collect sensor data, namely collection data, through each sensor attached to the extrusion-deposition fabrication process-based 3D printer 10.

Here, the 3D printer component may include at least one of the plate, belt, and bolt of the 3D printer. At least one acceleration sensor may include at least one acceleration sensor among the X-axis acceleration sensor 102, Y-axis acceleration sensor 103, and Z-axis acceleration sensor 104. Also, at least one acceleration sensor may include the acoustic emission sensor 101.

The feature element extracting unit 120 extracts at least one feature element from feature elements of acceleration data and feature elements of sound data for determining a normal and abnormal states of 3D printer components by using at least one of the acceleration data and the sound data. The feature element extracting unit 120 may extract feature elements of the 3D printer components in a normal and failure states based on the collected collection data, namely sensor data. The feature element of acceleration data extracted by the feature element extracting unit 120 may include the feature element of at least one acceleration data among feature elements of the X-axis, Y-axis, and Z-axis acceleration data.

Here, the feature element extracting unit 120 may extract at least one feature element among the feature elements of acceleration data and sound data by dividing the collection data corresponding to a deposition layer number of an output work of the 3D printer 10 according to each deposition layer.

The health state diagnosing unit 130 diagnoses health state of the 3D printer component by analyzing a correlation among at least one of the feature elements of the acceleration data and the feature elements of the sound data and the abnormal state of the 3D printer component by using machine learning. In other words, the health state diagnosing unit 130 analyzes a correlation between the extracted feature element and a failure state of the 3D printer component, and performs modeling based on the analysis result. The health state diagnosing unit 130 may learn the health state diagnosis model of the 3D printer component to which the machine learning algorithm has been applied and verify the health state diagnosis model of the 3D printer component through the learned health state diagnosis model.

Here, the health state diagnosing unit 130 may define health state by dividing at least one acceleration data among feature elements of the X-axis acceleration data, feature elements of the Y-axis acceleration data, and feature elements of the Z-axis acceleration data into data in a normal state and data in an abnormal state. The abnormal state may include at least one abnormal state such as a loose belt, loosened bolt, or tilted plate.

Afterwards, the health state diagnosing unit 130 may predict a failure of the 3D printer component by using the health state diagnosis result of the 3D printer component.

According to various embodiments, the health state diagnosing apparatus 100 of a 3D printer may include a sensor module, memory, and processor. The data collecting unit 110 may be implemented by the sensor module. The feature element extracting unit 120 and the health state diagnosing unit 130 may be implemented by the processor.

The sensor may collect at least one of acceleration data due to a movement of the 3D printer component and sound data during the 3D printing process as collection data.

The memory may store at least one of the acceleration data and the sound data collected by the sensor module. The memory may store at least one or more instructions.

The processor executes one or more instructions stored in the memory. The processor may extract at least one feature element from the feature elements of acceleration data and the feature elements of sound data for determining the normal and abnormal states of the 3D printer component by using at least one of acceleration data and sound data. The processor may diagnose health state of the 3D printer component by analyzing a correlation between at least one of the feature element of the acceleration data and the feature element of the sound data and the abnormal states of the 3D printer component by applying machine learning. In other words, the processor may analyze a correlation between an extracted feature element and a failure state of the 3D printer component; and perform modeling based on the analysis result. The processor may learn the health state diagnosis model of the 3D printer component to which the machine learning algorithm has been applied and verify the health state diagnosis model of the 3D printer component through the learned health state diagnosis model. Through this operation, the processor may predict a failure of the 3D printer component from the health state diagnosis result of the 3D printer component.

FIGS. 4A to 4D illustrate collection data collected about a normal and a failure state of a 3D printer according to one example embodiment of the present invention.

As shown in FIGS. 4A to 4D, the health state diagnosing apparatus 100 collects at least one sensor data from the X-axis, Y-axis, and Z-axis acceleration data and acoustic emission data by using the acceleration sensor of each axis attached to the 3D printer 10 during the extrusion-deposition fabrication-based 3D printing process.

FIG. 4A shows X-axis acceleration data measured by the X-axis acceleration sensor 102 attached to the 3D printer 10. In the X-axis acceleration data of FIG. 4A, the X-axis acceleration data 401 indicated by blue color represent the normal state. On the other hand, the X-axis acceleration data (402 to 404) indicated by red color represent a state in which health state of a 3D printer component is below a reference value with respect to the X-axis, or the corresponding component is out of order.

Figure 4B:
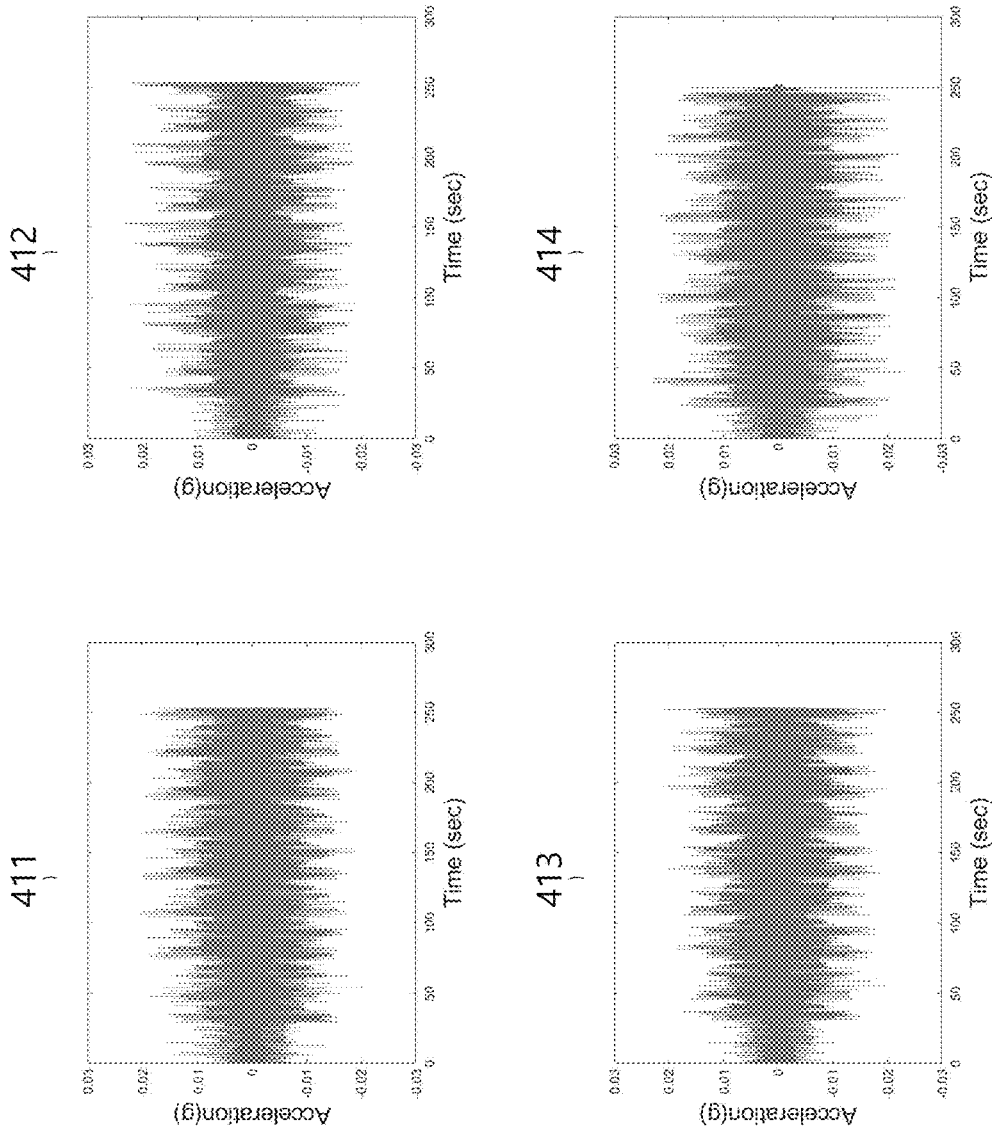

FIG. 4B shows Y-axis acceleration data measured by the Y-axis acceleration sensor 103 attached to the 3D printer 10. In the Y-axis acceleration data of FIG. 4B, the Y-axis acceleration data 411 indicated by blue color represent the normal state. On the other hand, the Y-axis acceleration data (412 to 414) indicated by red color represent a state in which health state of a 3D printer component is below a reference value with respect to the Y-axis, or the corresponding component is out of order.

Figure 4C:
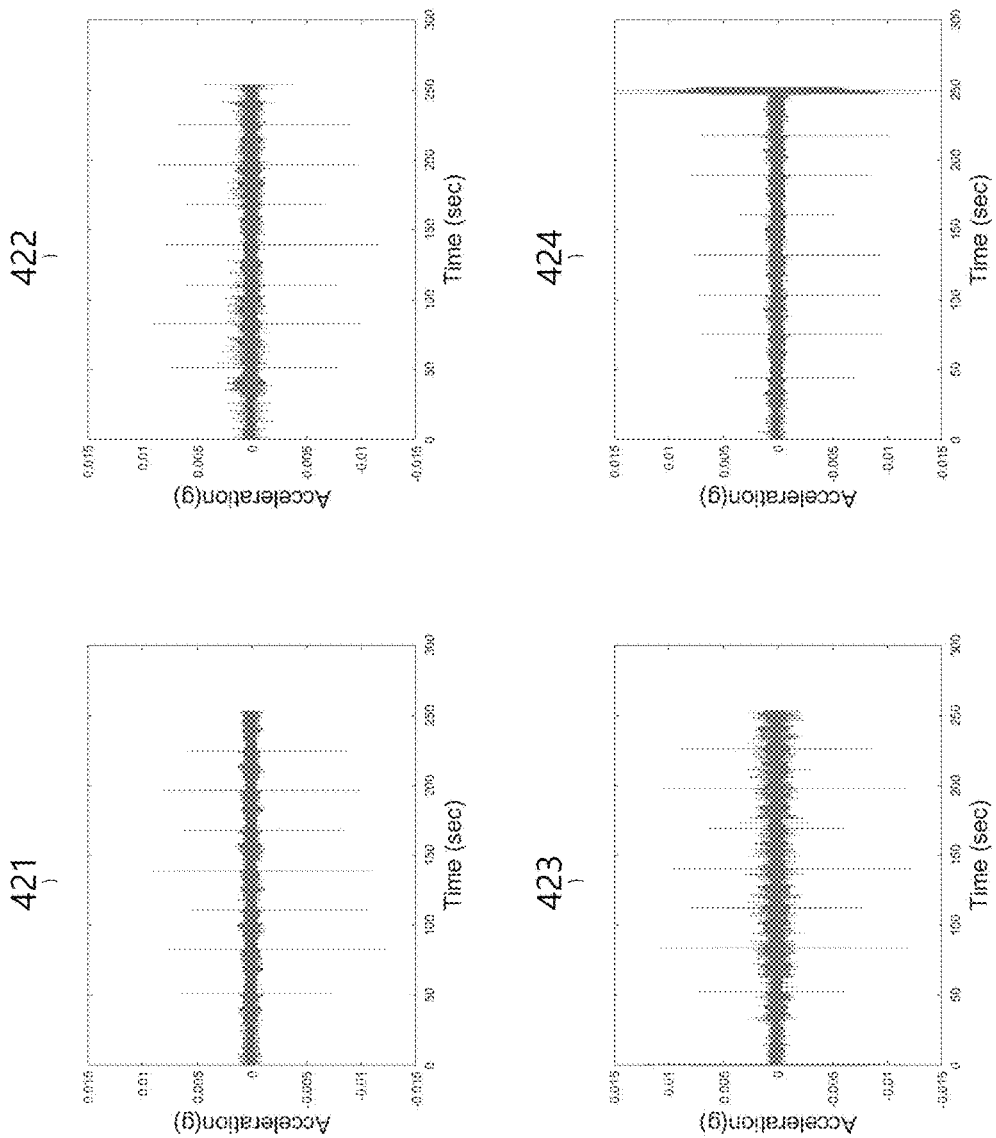

FIG. 4C shows Z-axis acceleration data measured by the Z-axis acceleration sensor 104 attached to the 3D printer 10. In the Z-axis acceleration data of FIG. 4C, the Z-axis acceleration data 421 indicated by blue color represent the normal state. On the other hand, the Z-axis acceleration data (422 to 424) indicated by red color represent a state in which health state of a 3D printer component is below a reference value with respect to the Z-axis, or the corresponding component is out of order.

FIG. 4D shows acoustic emission data measured by the acoustic emission sensor 101 attached to the 3D printer. In the acoustic emission data of FIG. 4D, the acoustic emission data 431 indicated by blue color represent the normal state. On the other hand, the acoustic emission data (432 to 434) indicated by red color represent a state in which health state of a 3D printer component is below a reference value in terms of sound generation, or the corresponding component is out of order.

FIGS. 5A to 5F, FIGS. 6A to 6F, FIGS. 7A to 7F, FIG. 8A to 8F, FIGS. 9A to 9F, and FIGS. 10A to 10F illustrate feature elements extracted about a normal and a failure state of a 3D printer according to one example embodiment of the present invention.

The health state diagnosing apparatus 100 according to one example embodiment of the present invention may divide the whole massive data corresponding to a total of 8 layers, which is the number of deposition layers of a 3D output object, according to the respective layers and extract at least one feature element corresponding to each layer. The whole massive data may correspond to the data collected from at least one of the X-axis, Y-axis, and Z-axis acceleration data and the acoustic emission data by using the acceleration sensors (102 to 104) of the respective axes and the acoustic emission sensor 101 attached to the 3D printer during the extrusion-deposition fabrication-based 3D printing process.

Here, at least one feature element may include at least one of root mean square (RMS), maximum, crest factor, variance, kurtosis, and skewness feature element.

FIGS. 5A to 10F illustrate feature elements extracted from the X-axis, Y-axis, and Z-axis acceleration data and the acoustic emission data by which health state of an equipment component may be determined as a normal or an abnormal state after a feature element is extracted from the apparatus for diagnosing health state according to one example embodiment of the present invention.

Figure 5A:
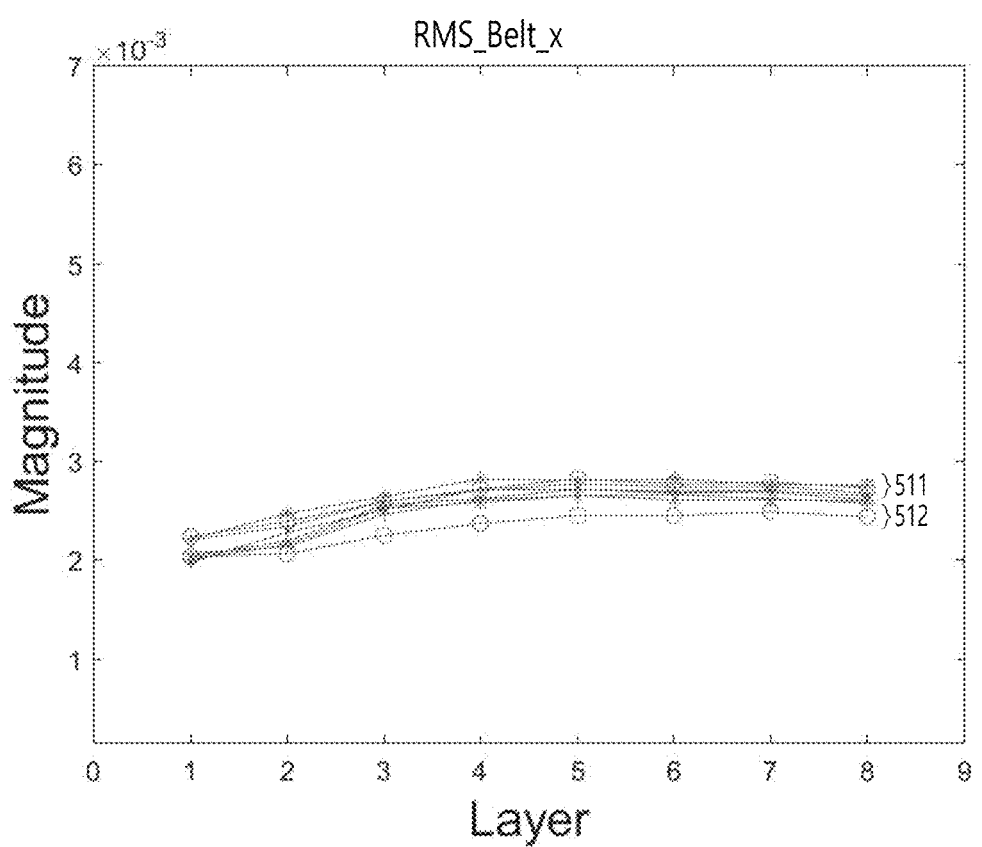
FIGS. 5A to 5F, FIGS. 6A to 6F, FIGS. 7A to 7F, FIG. 8A to 8F, FIGS. 9A to 9F, and FIGS. 10A to 10F illustrate feature elements extracted about a normal and a failure state of a 3D printer according to one example embodiment of the present invention.

FIG. 5A illustrates the RMS feature element (RMS_Belt_x) of the X-axis acceleration data with respect to a loose belt.

Figure 5B:
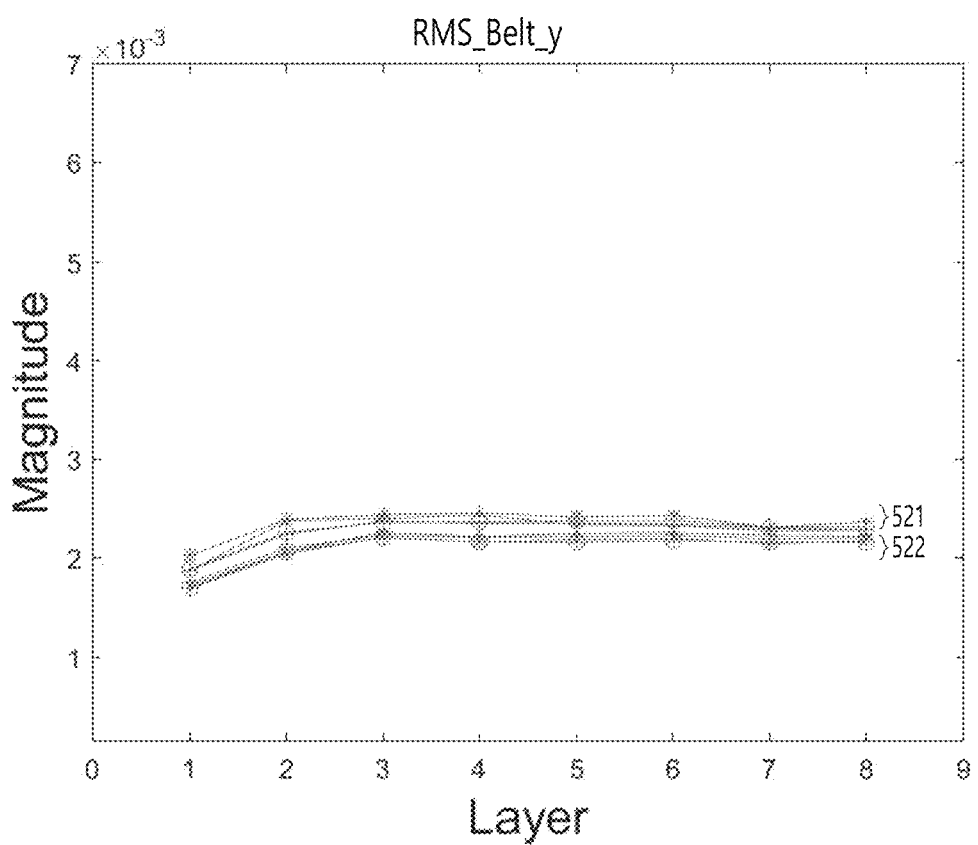

FIG. 5B illustrates the RMS feature element (RMS_Belt_y) of the Y-axis acceleration data with respect to a loose belt.

Figure 5C:
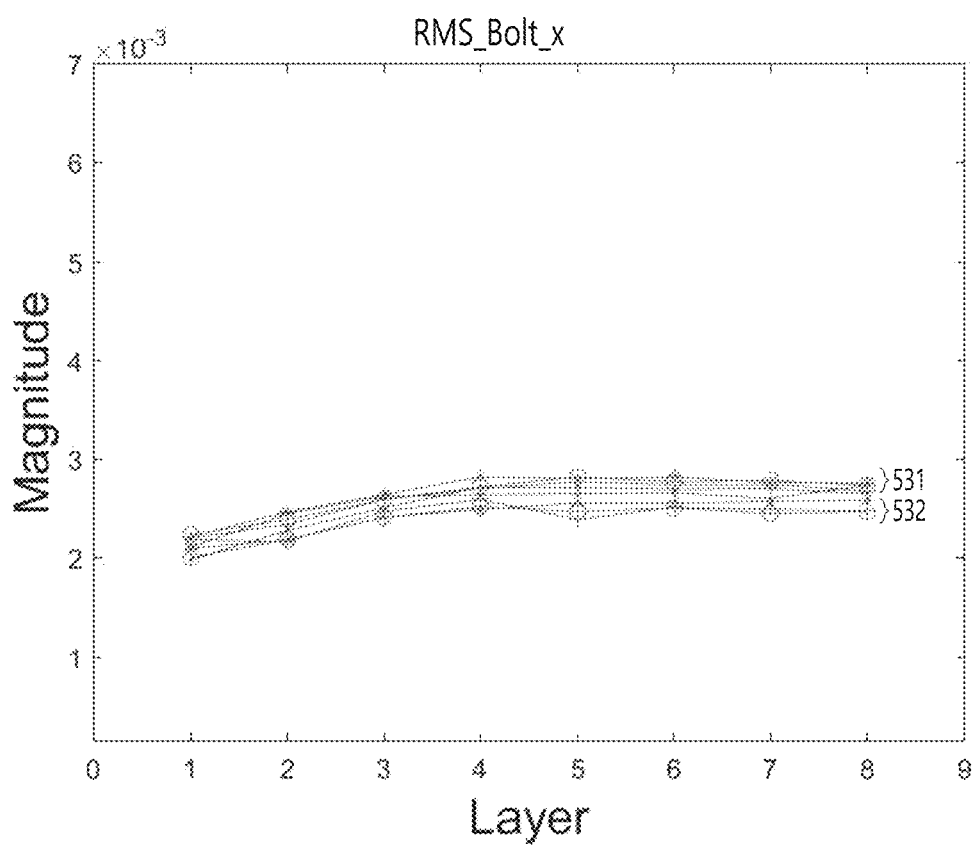

FIG. 5C illustrates the RMS feature element (RMS_Bolt_x) of the X-axis acceleration data with respect to a loosened belt.

Figure 5D:
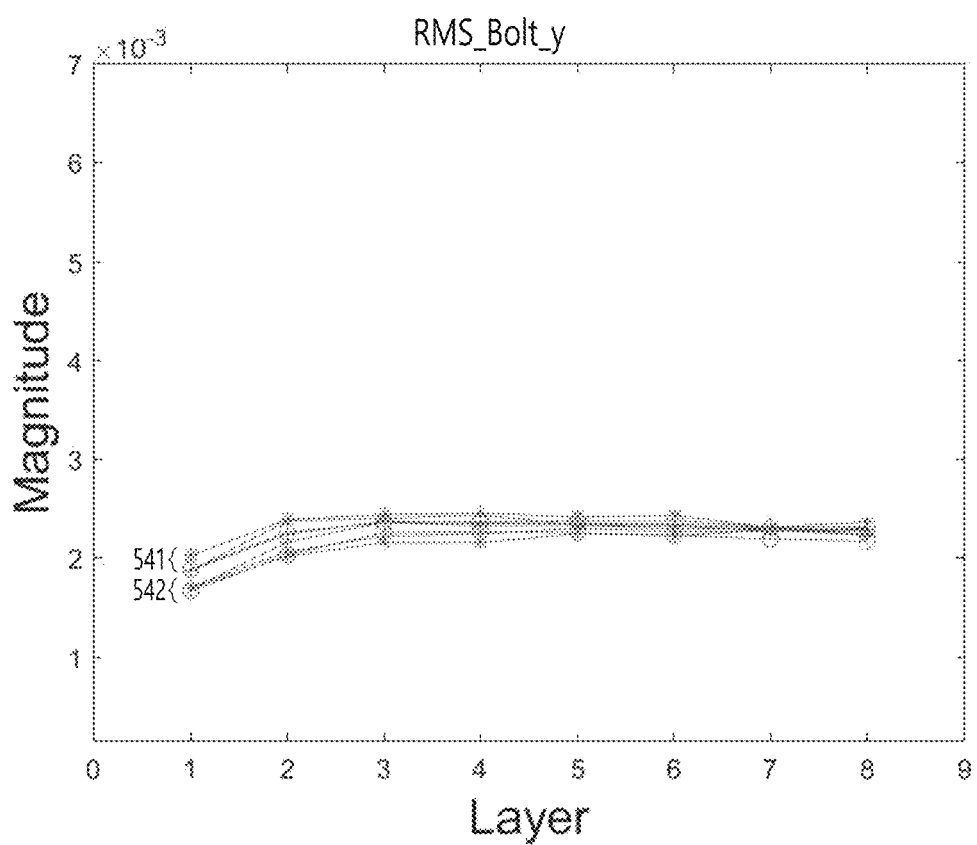

FIG. 5D illustrates the RMS feature element (RMS_Bolt_y) of the Y-axis acceleration data with respect to a loosened belt.

Figure 5E:
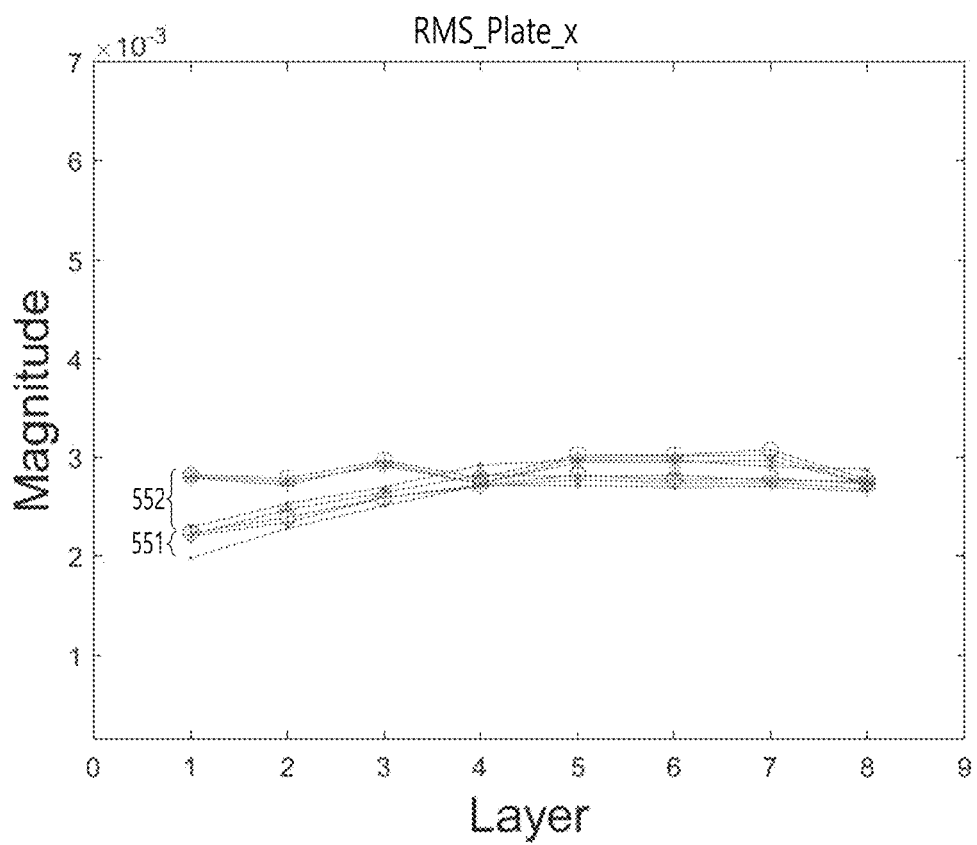

FIG. 5E illustrates the RMS feature element (RMS_Plate_x) of the X-axis acceleration data with respect to a tilted plate.

Figure 5F:
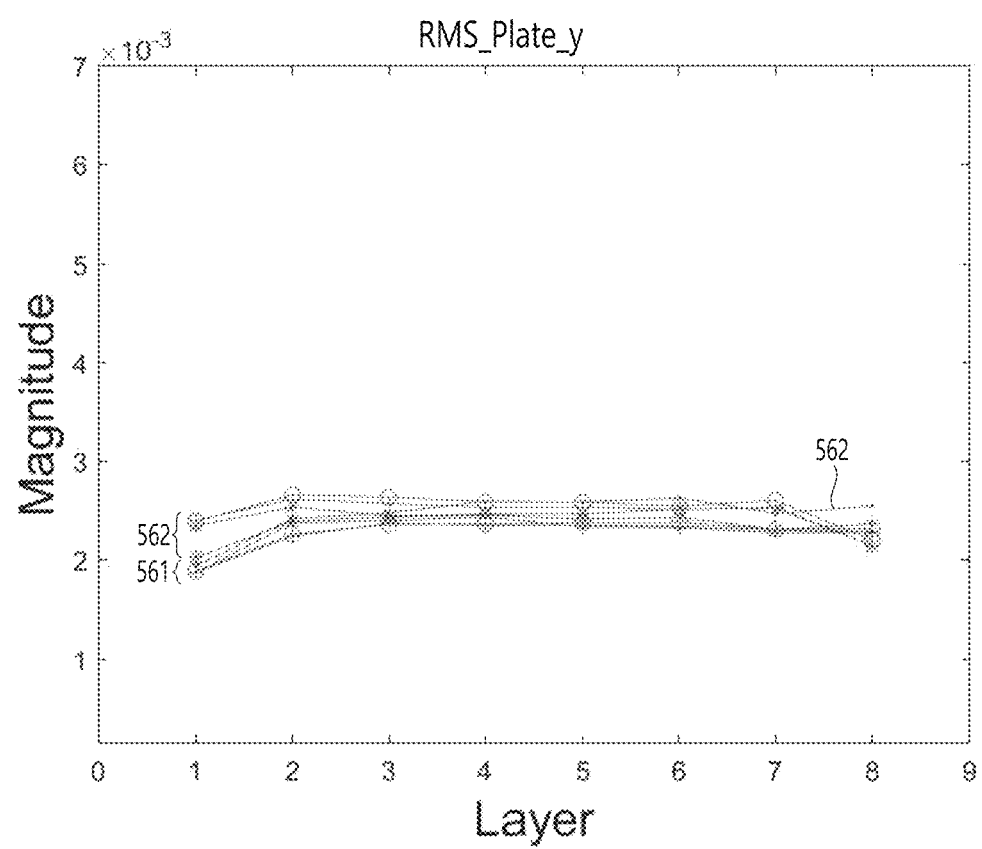

FIG. 5F illustrates the RMS feature element (RMS_Plate_y) of the Y-axis acceleration data with respect to a tilted plated.

Figure 6A:
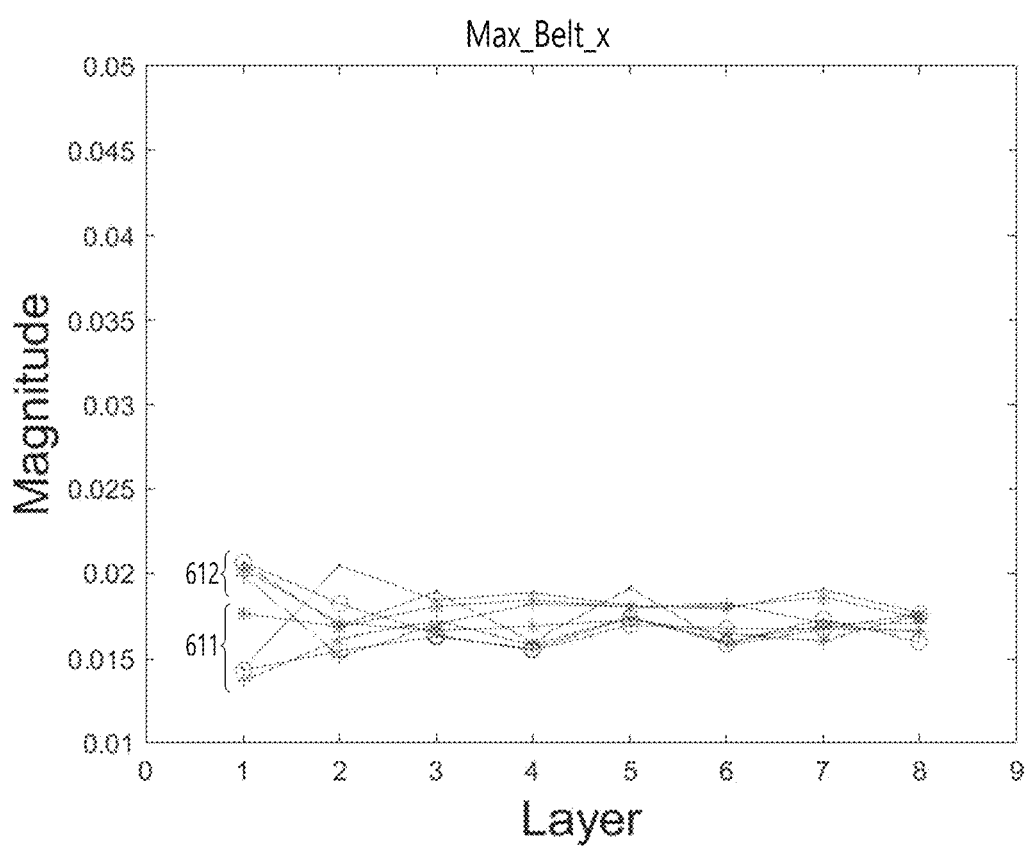

FIG. 6A illustrates the MAX feature element (MAX_Belt_x) of the X-axis acceleration data with respect to a loose belt.

Figure 6B:
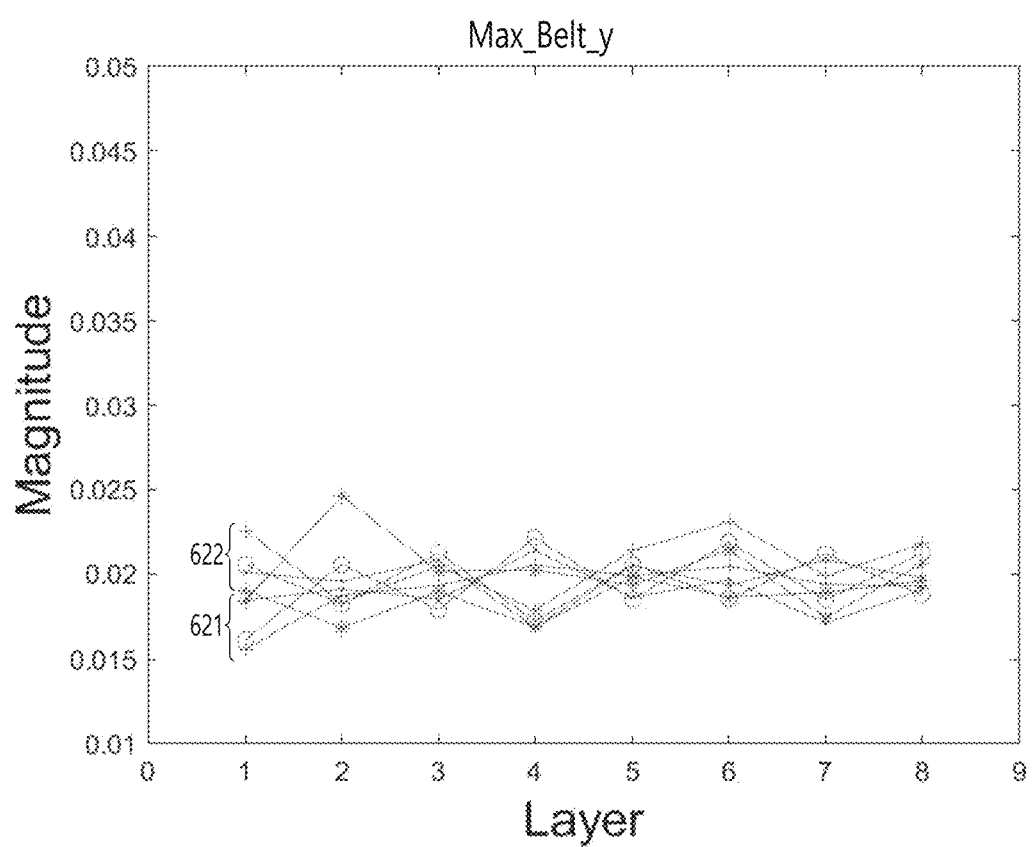

FIG. 6B illustrates the MAX feature element (MAX_Belt_y) of the Y-axis acceleration data with respect to a loose belt.

Figure 6C:
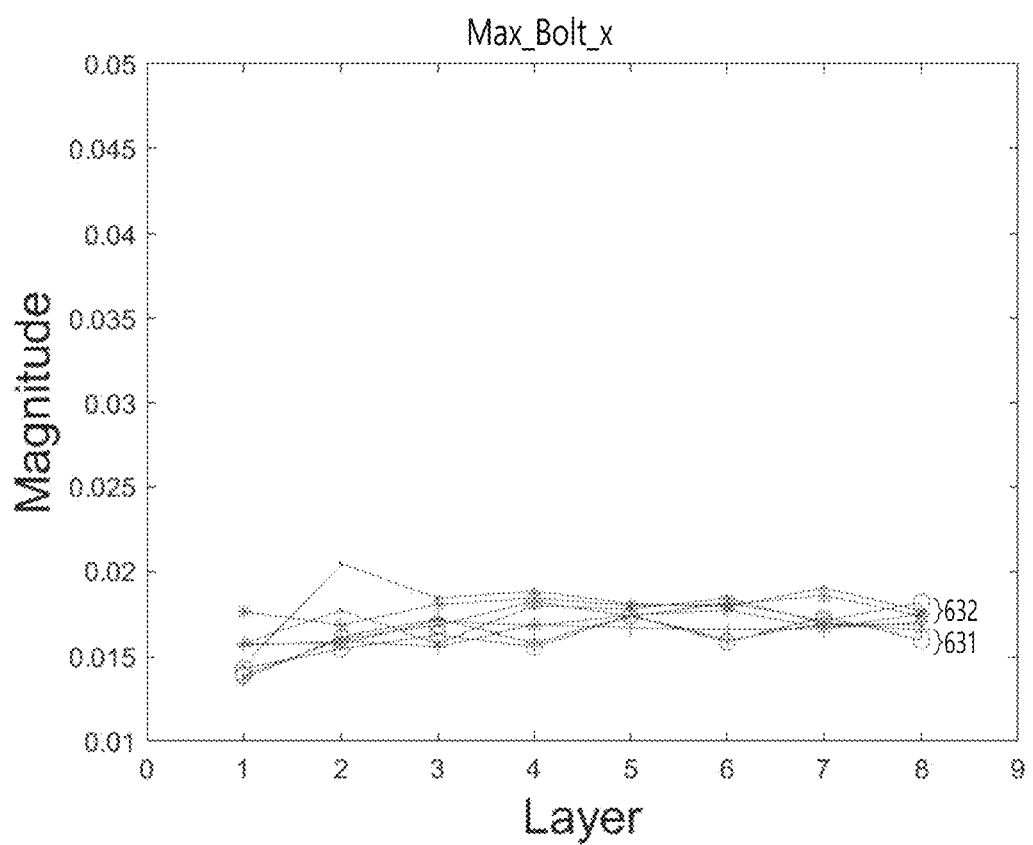

FIG. 6C illustrates the MAX feature element (MAX_Bolt_x) of the X-axis acceleration data with respect to a loosened belt.

Figure 6D:
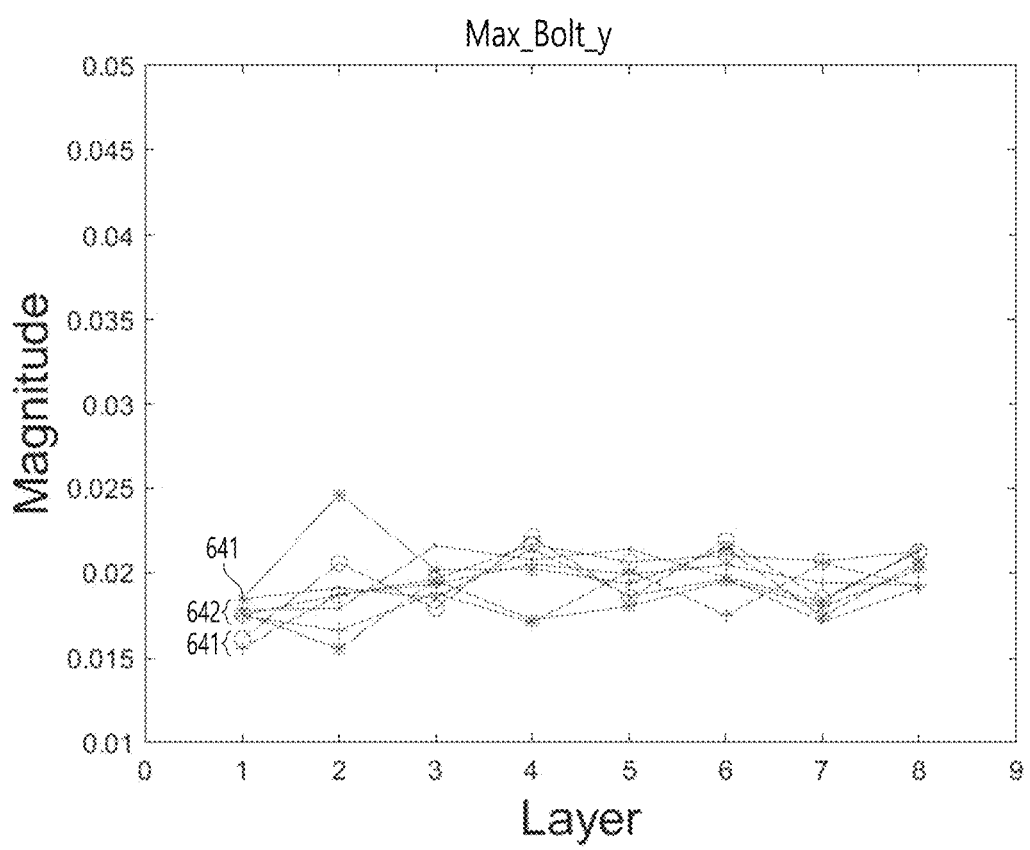

FIG. 6D illustrates the MAX feature element (MAX_Bolt_y) of the Y-axis acceleration data with respect to a loosened belt.

Figure 6E:
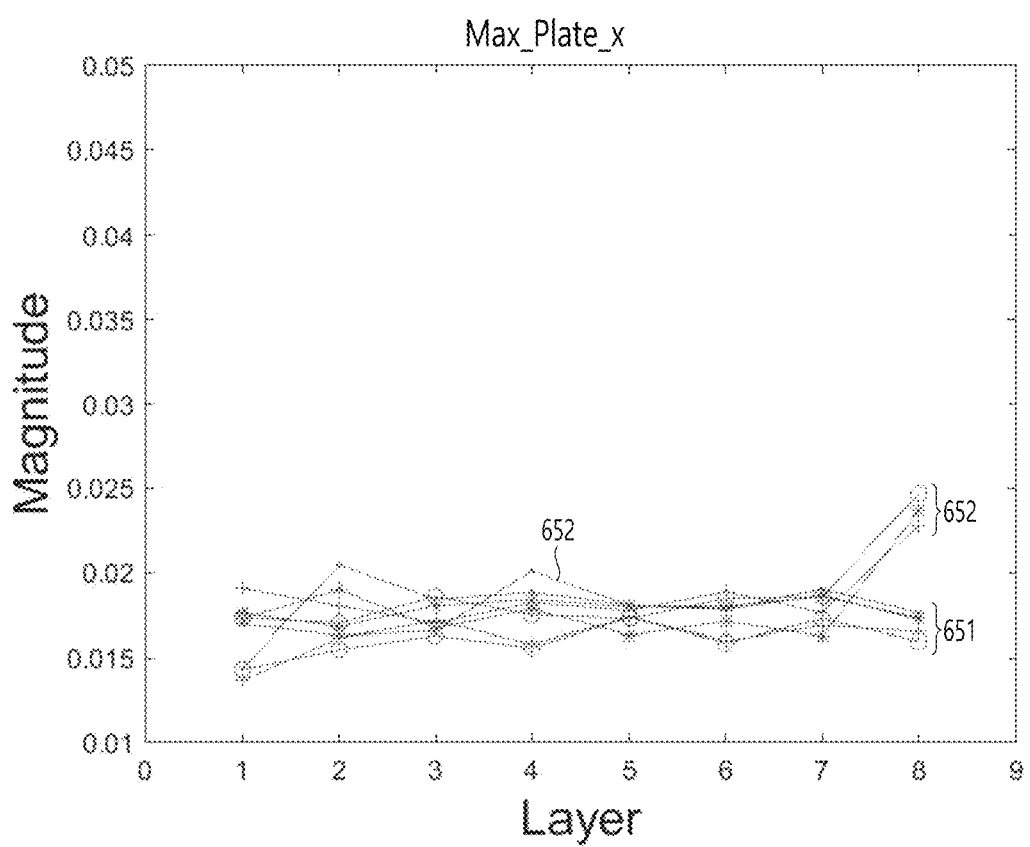

FIG. 6E illustrates the MAX feature element (MAX_Plate_x) of the X-axis acceleration data with respect to a tilted plate.

Figure 6F:
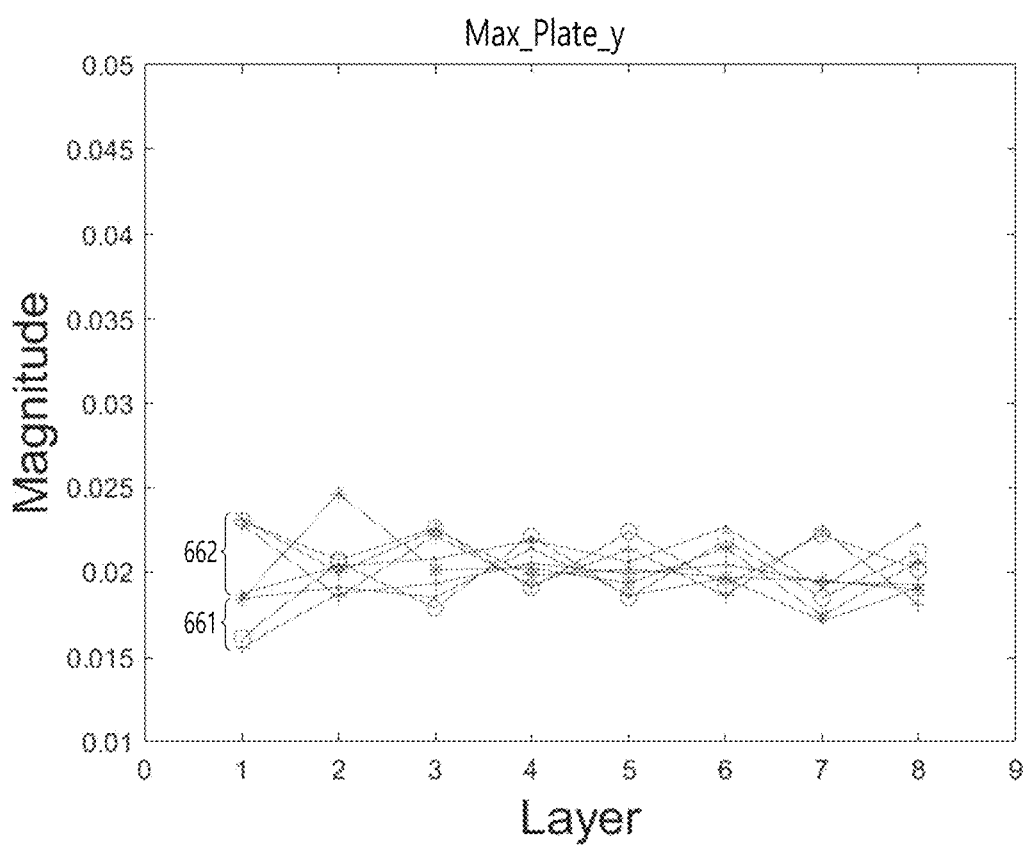

FIG. 6F illustrates the MAX feature element (MAX_Plate_y) of the Y-axis acceleration data with respect to a tilted plated.

Figure 7A:
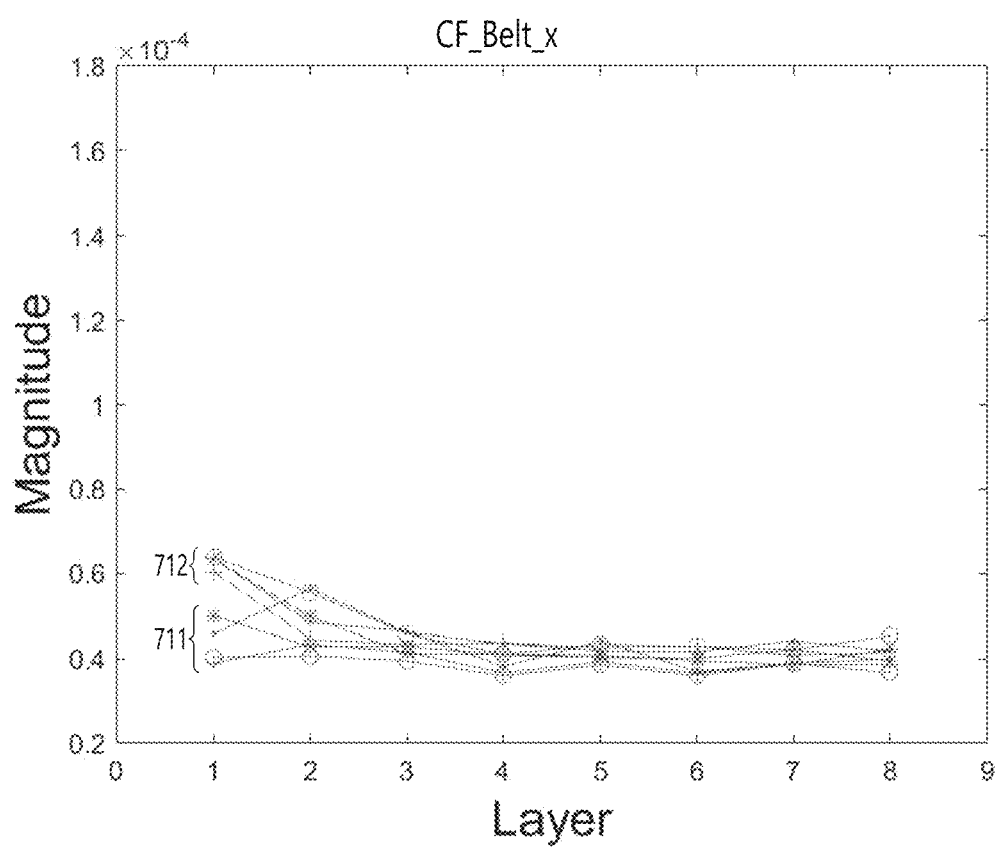

FIG. 7A illustrates the crest factor feature element (CF_Belt_x) of the X-axis acceleration data with respect to a loose belt.

Figure 7B:
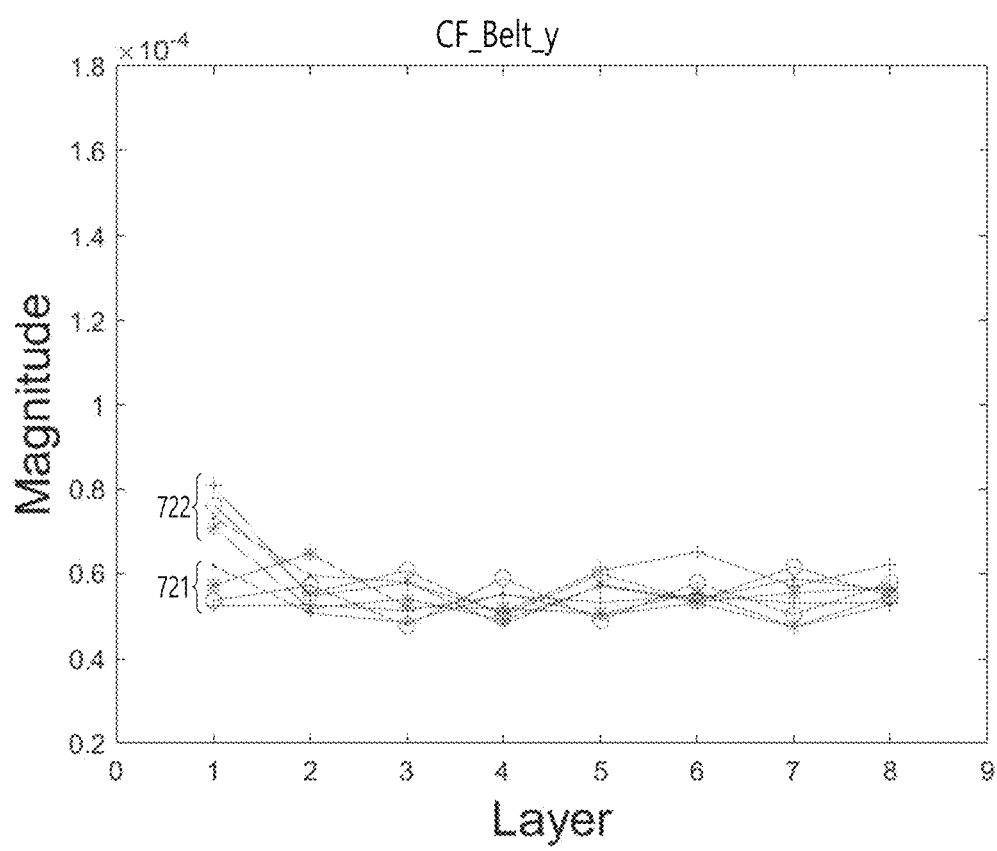

FIG. 7B illustrates the crest factor feature element (CF_Belt_y) of the Y-axis acceleration data with respect to a loose belt.

Figure 7C:
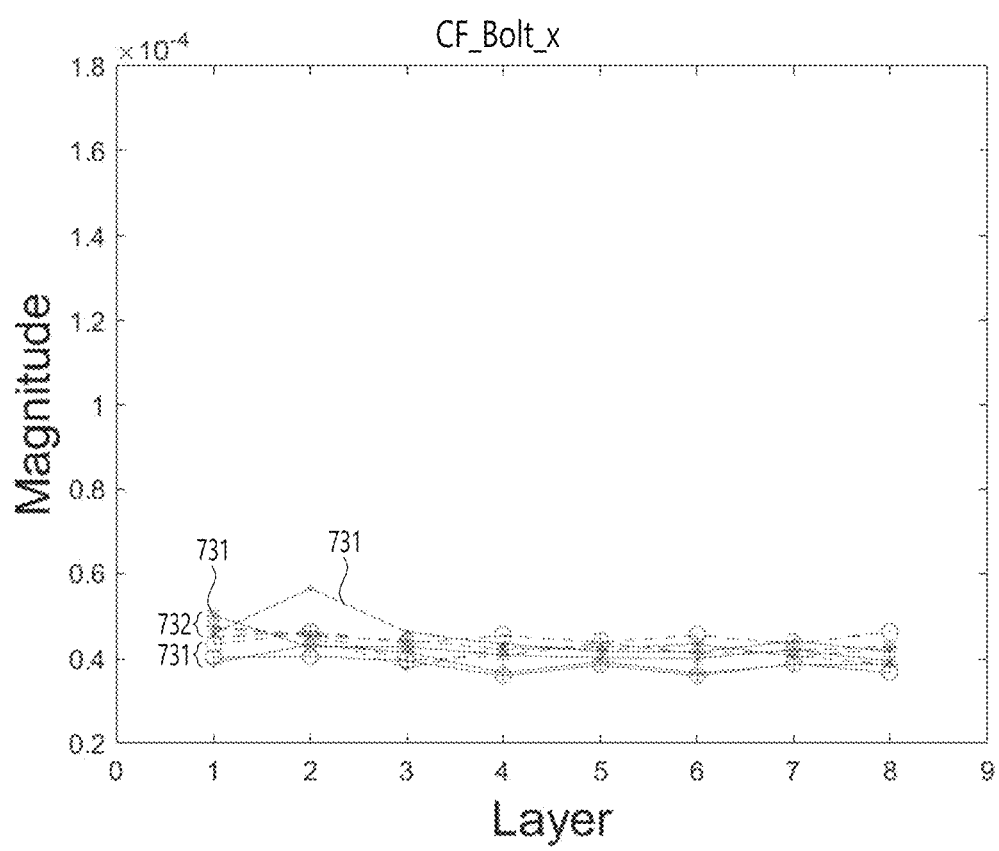

FIG. 7C illustrates the crest factor feature element (CF_Bolt_x) of the X-axis acceleration data with respect to a loosened belt.

Figure 7D:
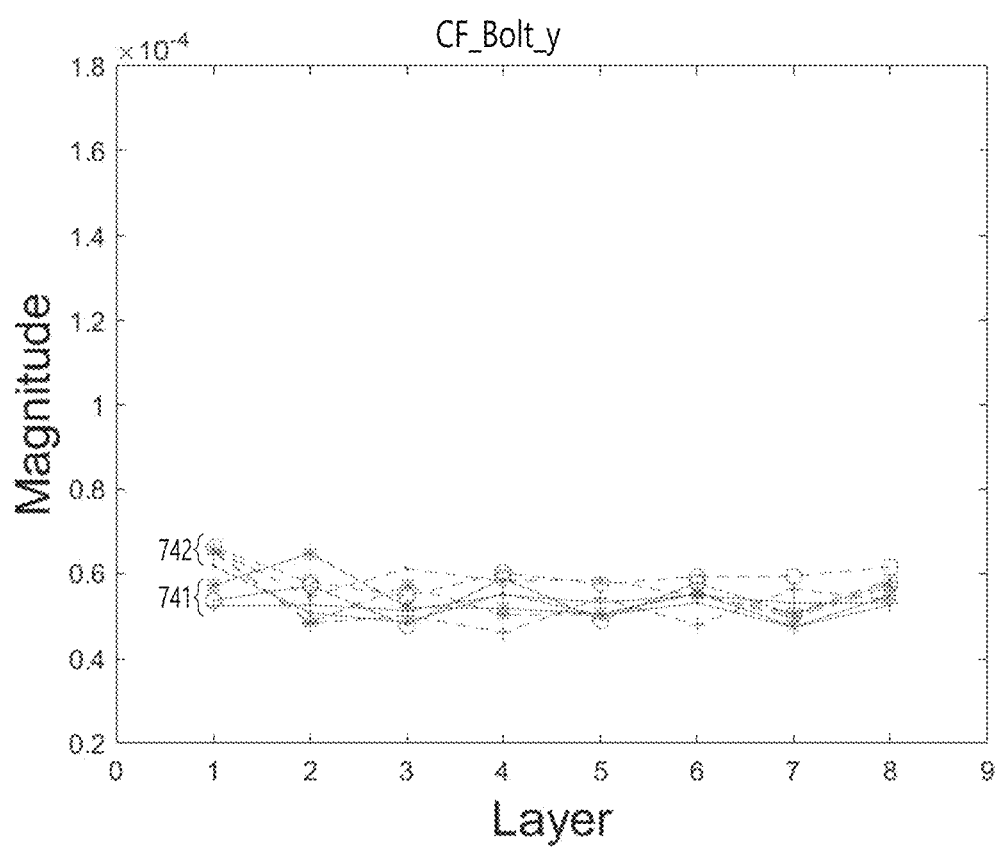

FIG. 7D illustrates the crest factor feature element (CF_Bolt_y) of the Y-axis acceleration data with respect to a loosened belt.

Figure 7E:
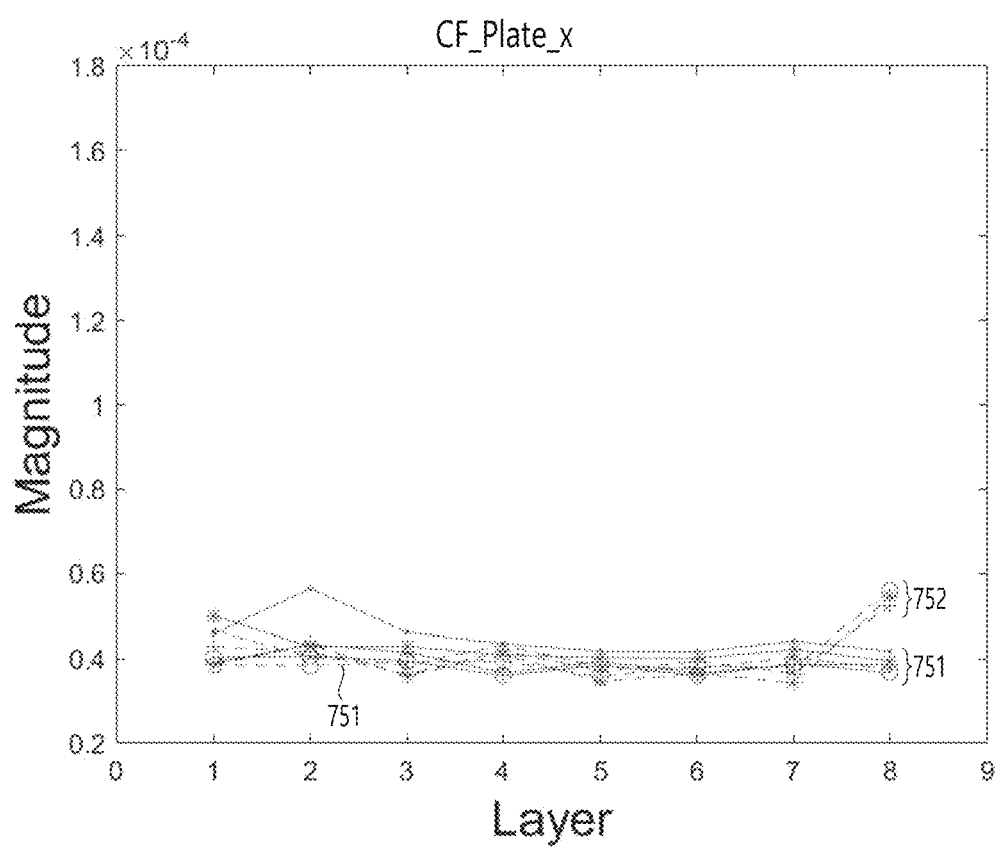

FIG. 7E illustrates the crest factor feature element (CF_Plate_x) of the X-axis acceleration data with respect to a tilted plate.

Figure 7F:
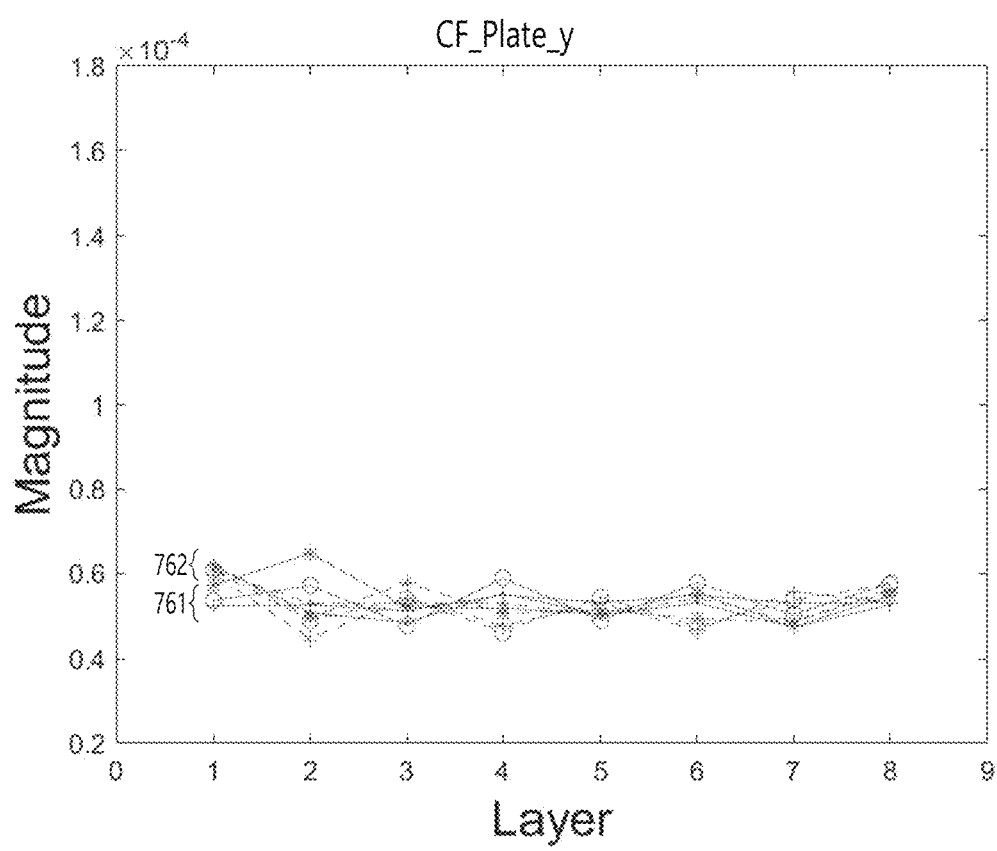

FIG. 7F illustrates the crest factor feature element (CF_Plate_y) of the Y-axis acceleration data with respect to a tilted plated.

Figure 8A:
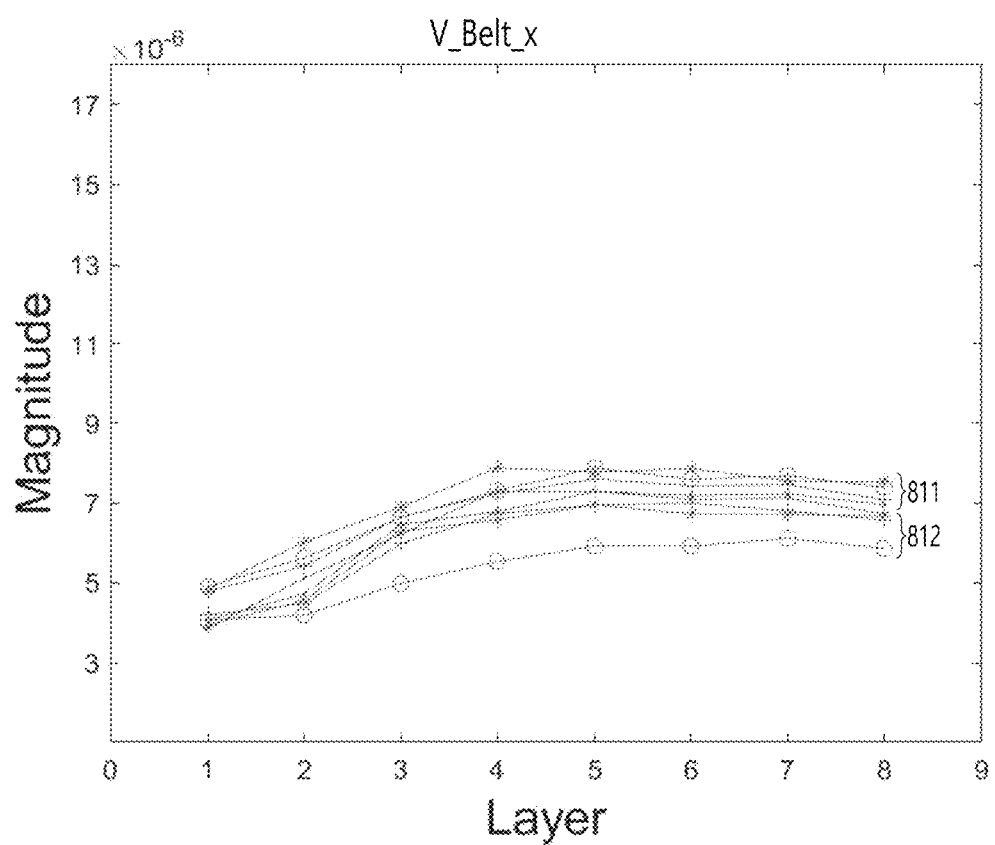

FIG. 8A illustrates the variance feature element (V_Belt_x) of the X-axis acceleration data with respect to a loose belt.

Figure 8B:
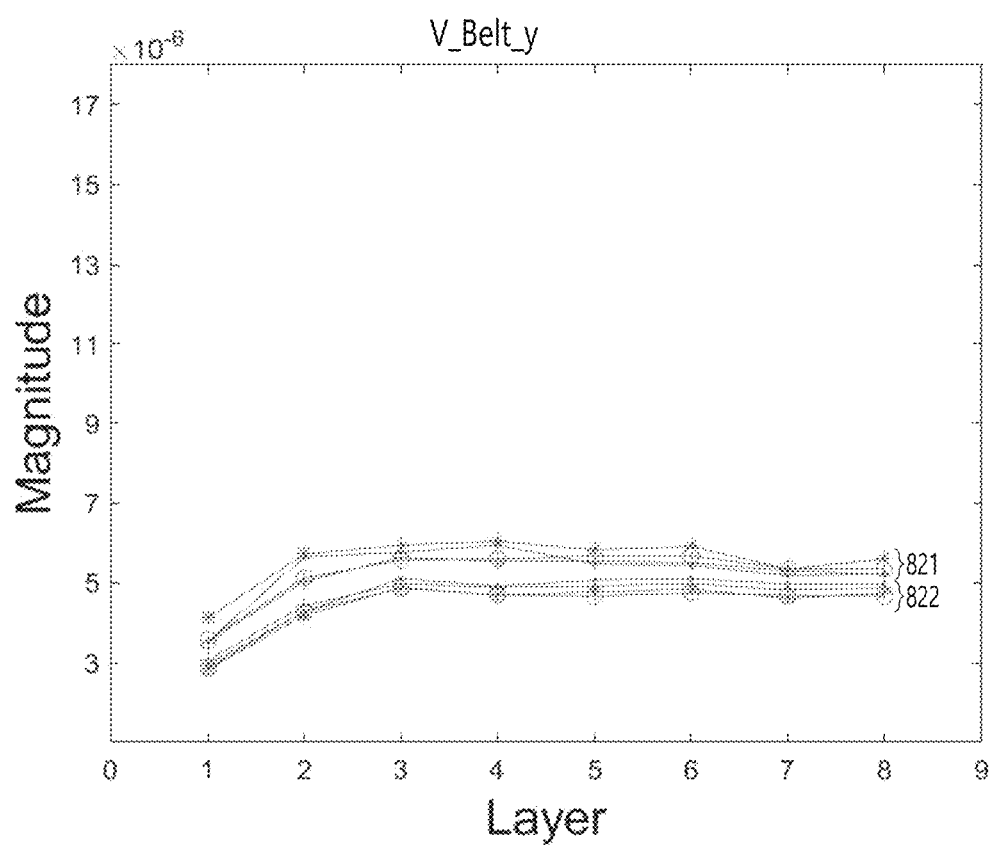

FIG. 8B illustrates the variance feature element (V_Belt_y) of the Y-axis acceleration data with respect to a loose belt.

Figure 8C:
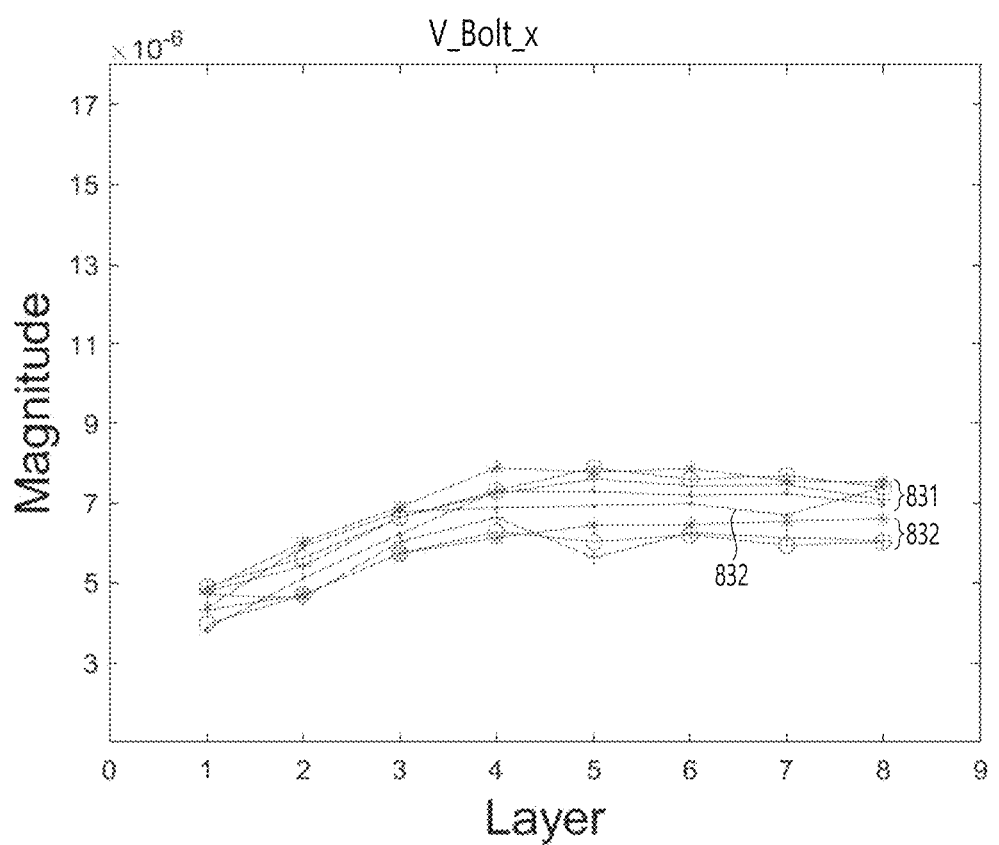

FIG. 8C illustrates the variance feature element (V_Bolt_x) of the X-axis acceleration data with respect to a loosened belt.

Figure 8D:
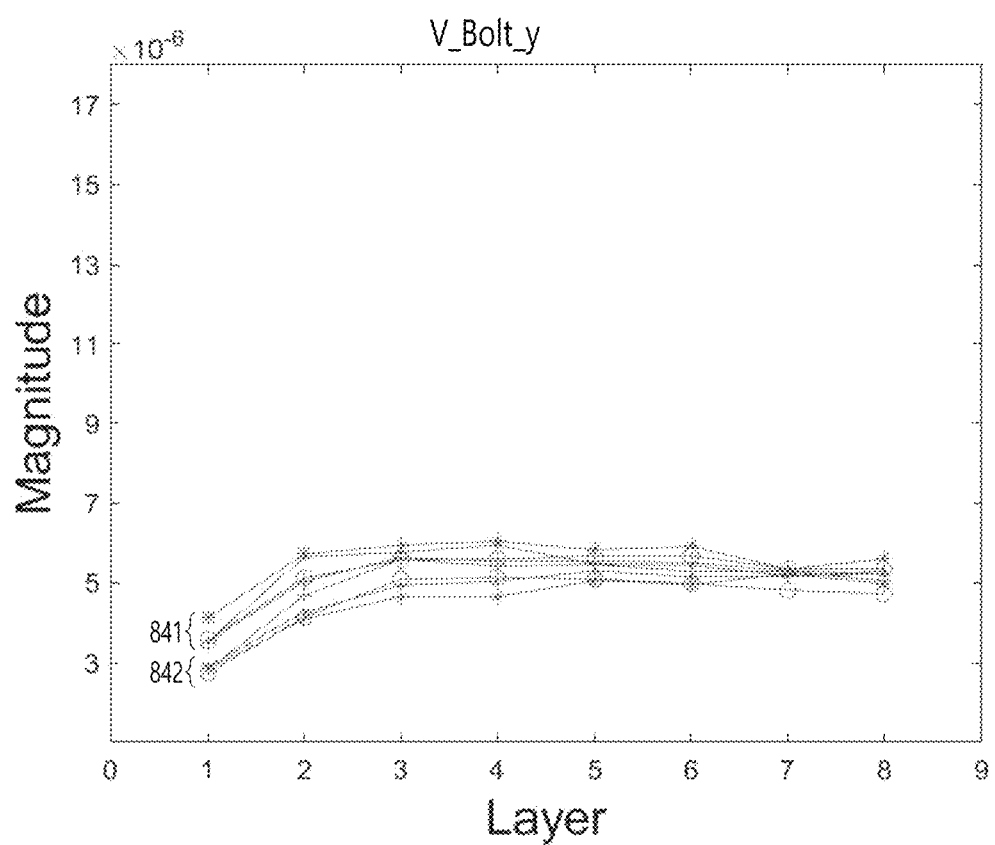

FIG. 8D illustrates the variance feature element (V_Bolt_y) of the Y-axis acceleration data with respect to a loosened belt.

Figure 8E:
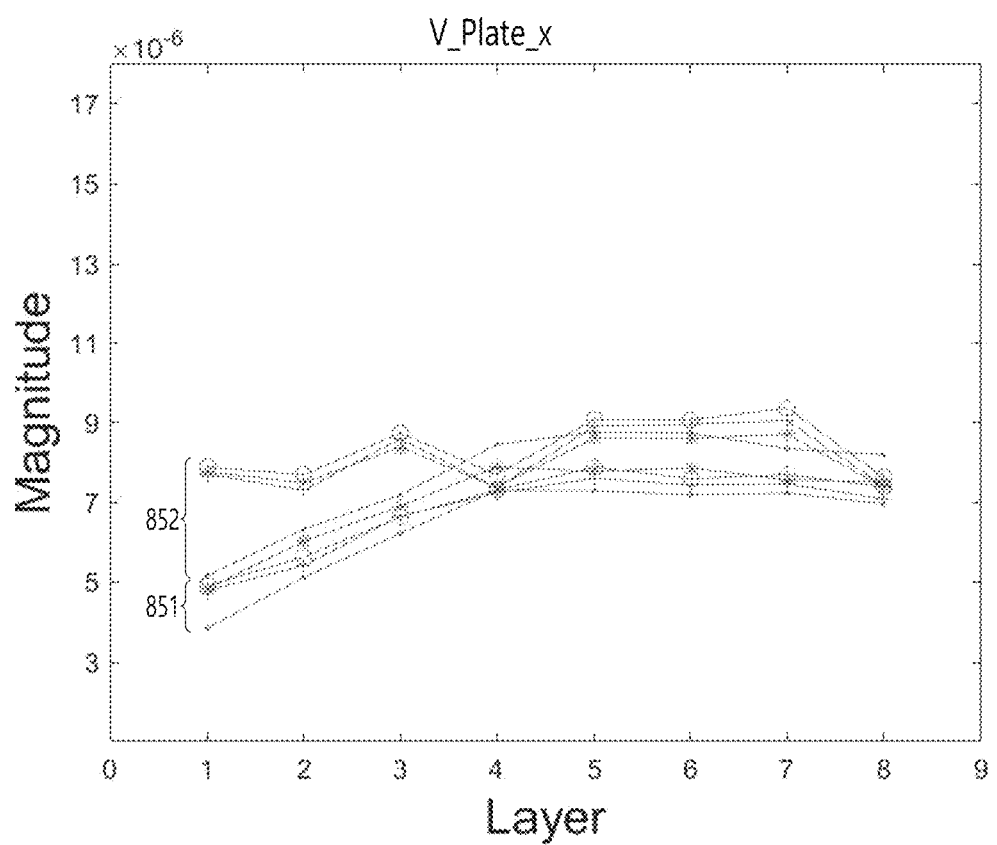

FIG. 8E illustrates the variance feature element (V_Plate_x) of the X-axis acceleration data with respect to a tilted plate.

Figure 8F:
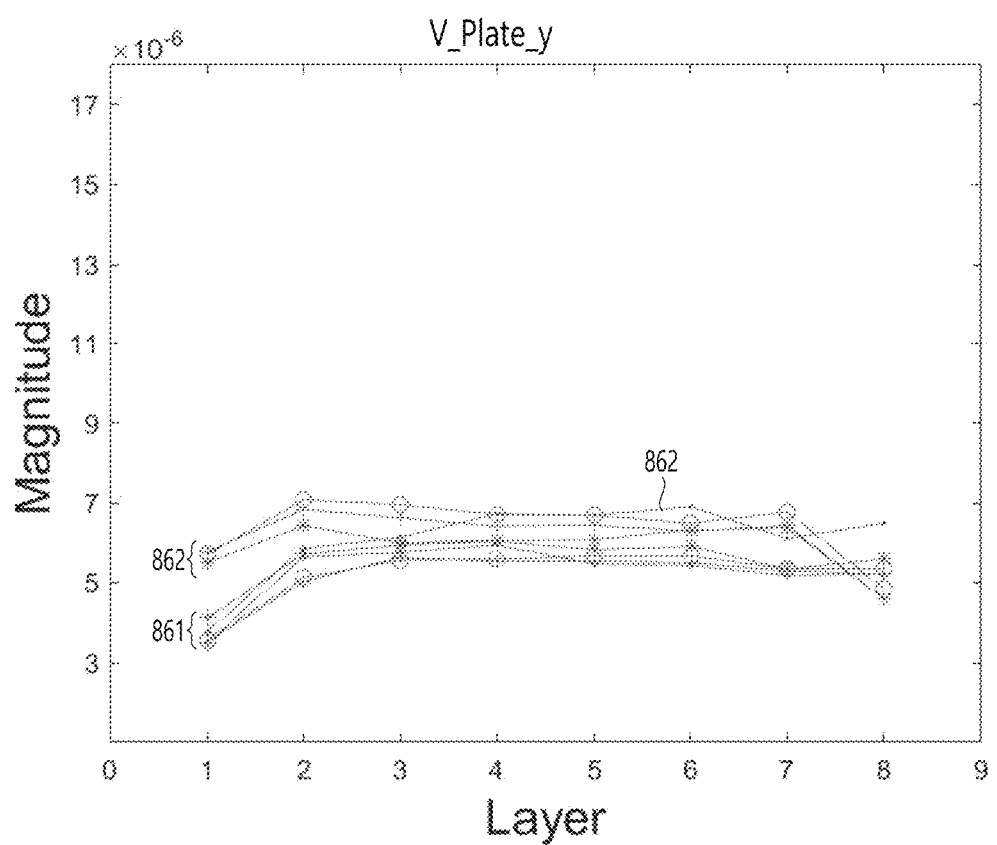

FIG. 8F illustrates the variance feature element (V_Plate_y) of the Y-axis acceleration data with respect to a tilted plated.

Figure 9A:
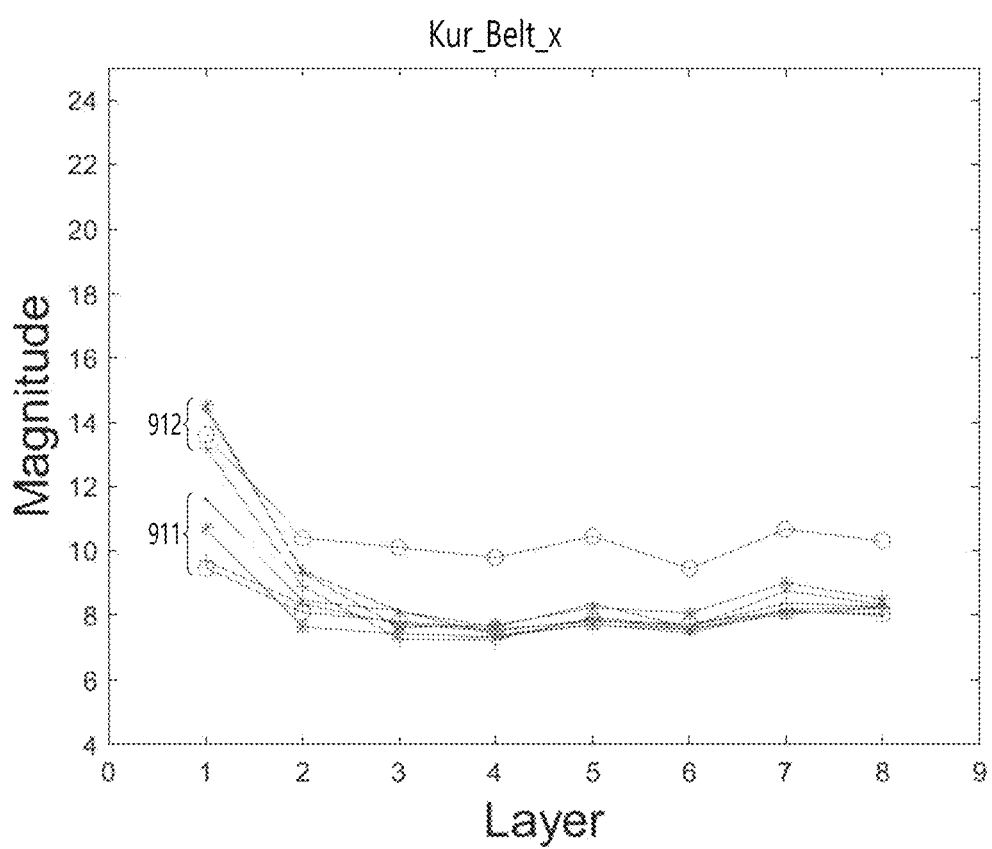

FIG. 9A illustrates the kurtosis feature element (Kur_Belt_x) of the X-axis acceleration data with respect to a loose belt.

Figure 9B:
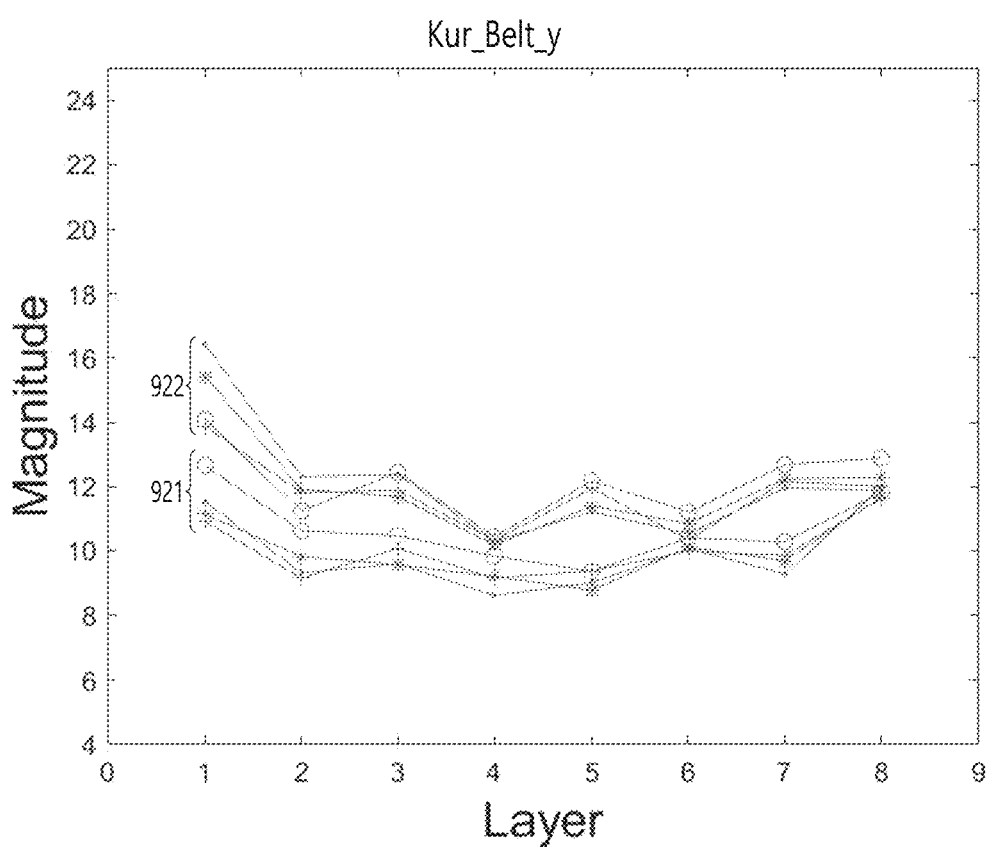

FIG. 9B illustrates the kurtosis feature element (Kur_Belt_y) of the Y-axis acceleration data with respect to a loose belt.

Figure 9C:
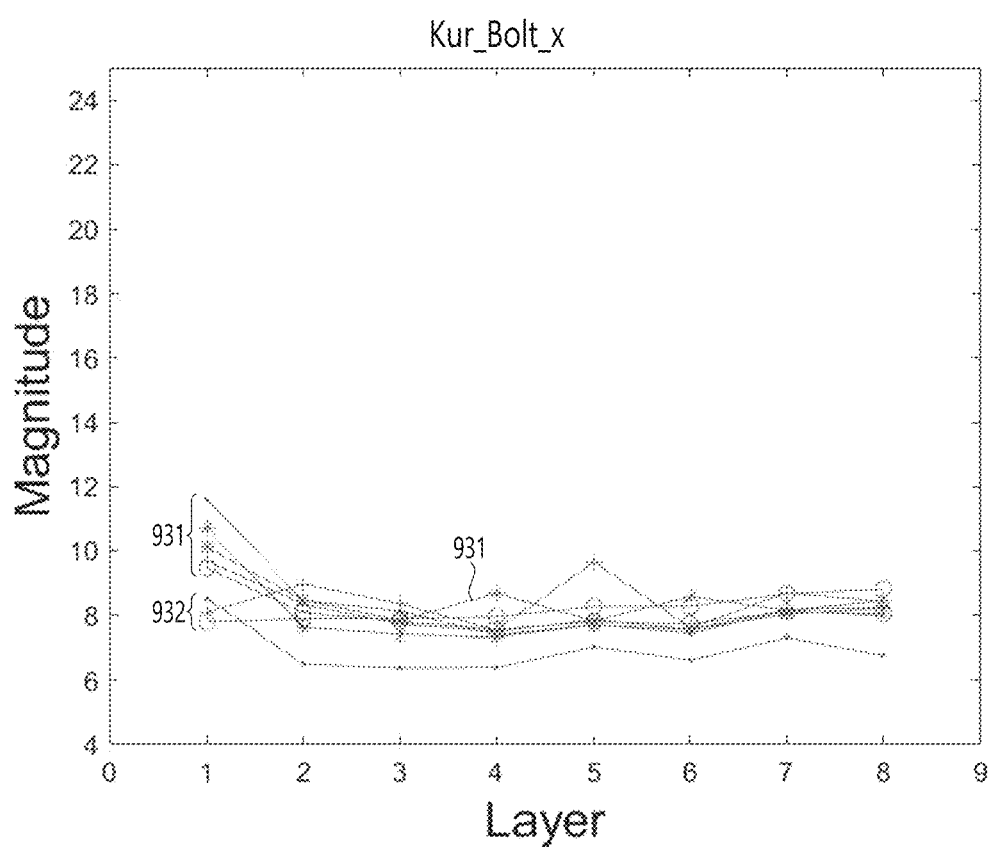

FIG. 9C illustrates the kurtosis feature element (Kur_Bolt_x) of the X-axis acceleration data with respect to a loosened belt.

Figure 9D:
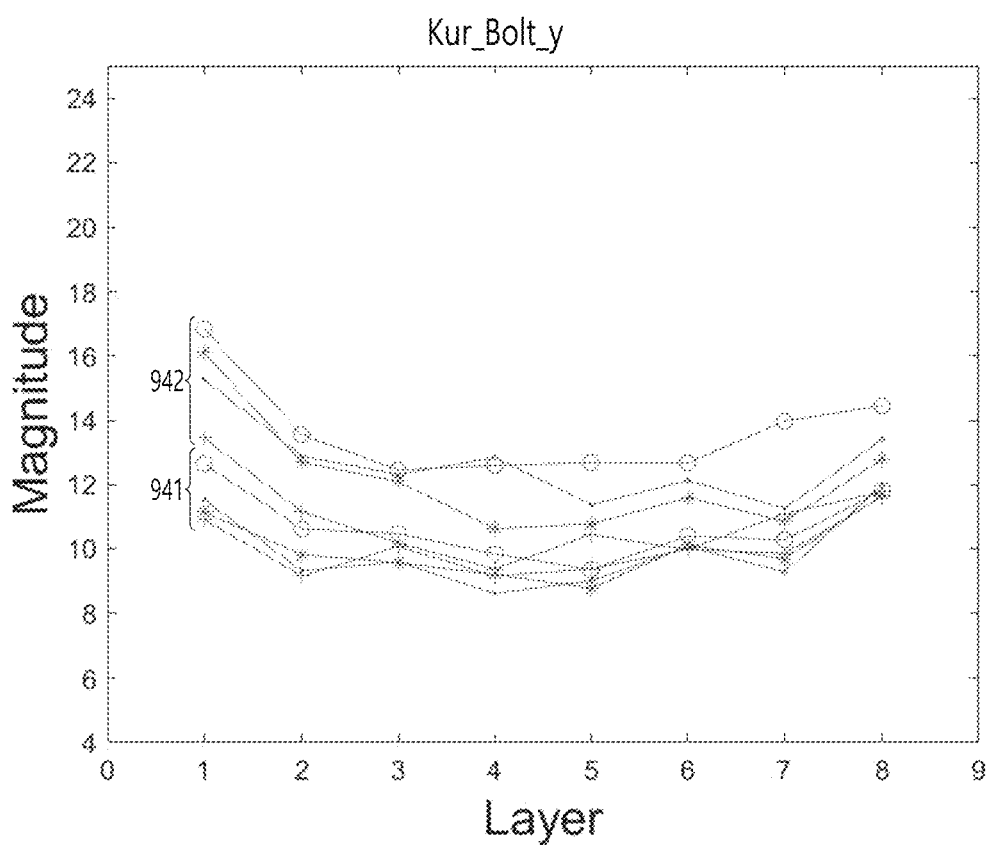

FIG. 9D illustrates the kurtosis feature element (Kur_Bolt_y) of the Y-axis acceleration data with respect to a loosened belt.

Figure 9E:
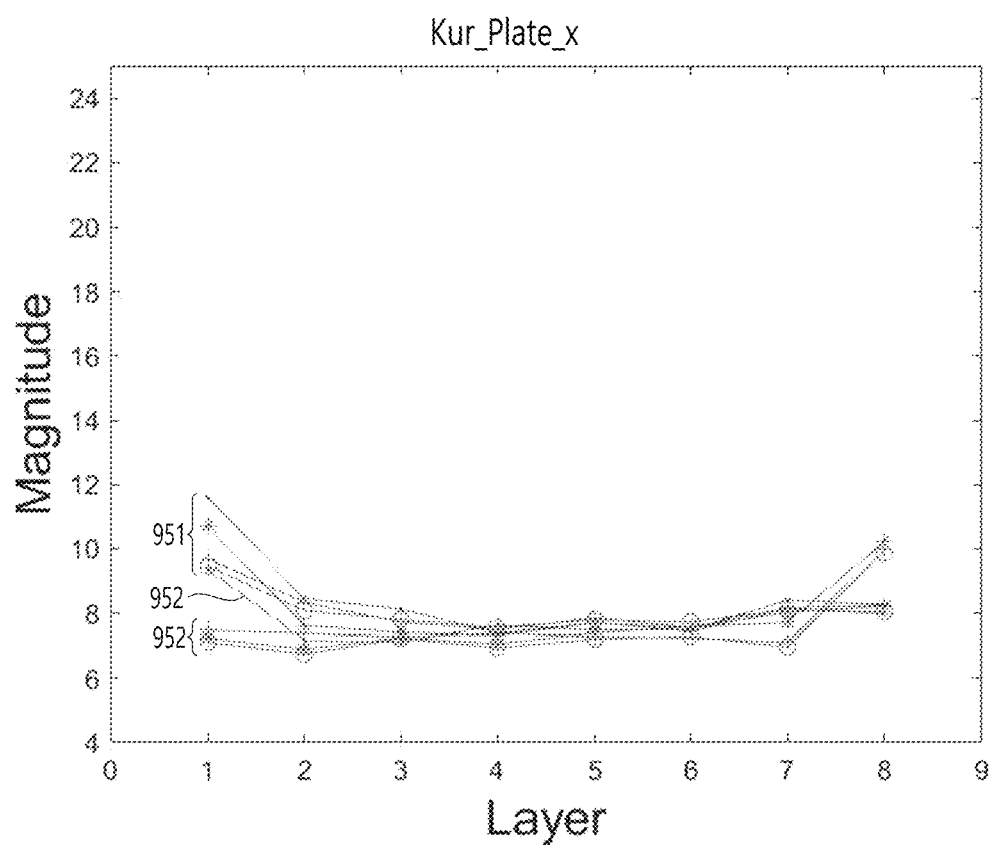

FIG. 9E illustrates the kurtosis feature element (Kur_Plate_x) of the X-axis acceleration data with respect to a tilted plate.

Figure 9F:
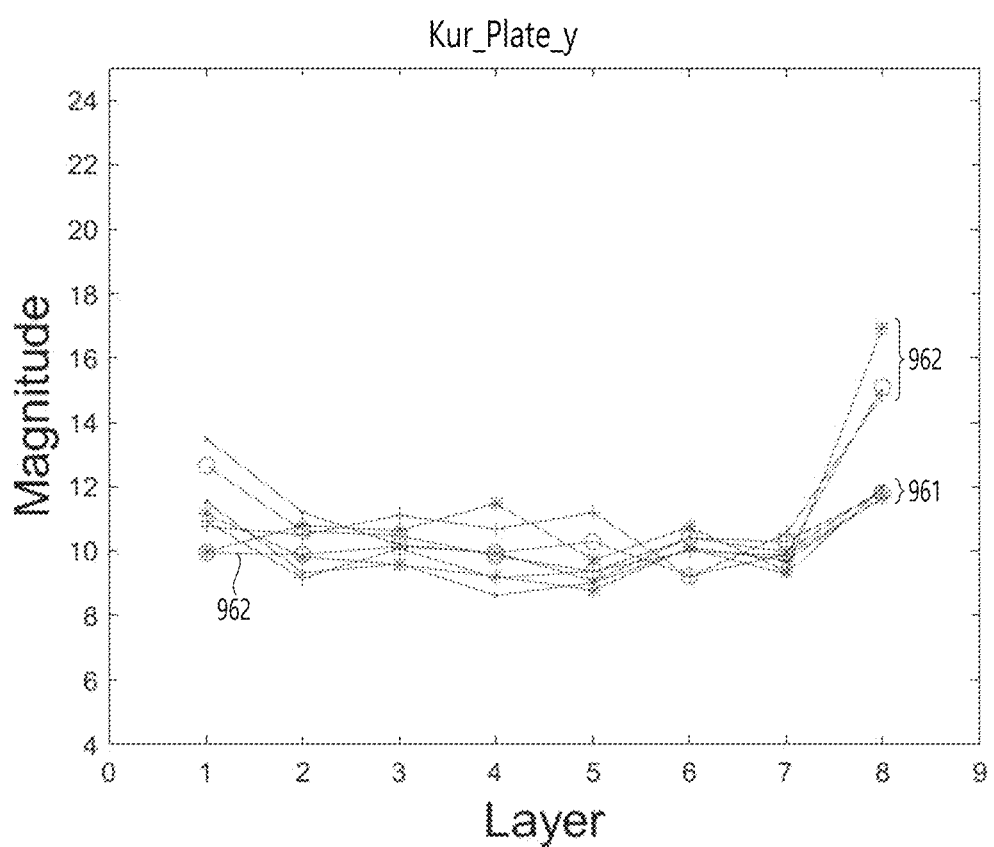

FIG. 9F illustrates the kurtosis feature element (Kur_Plate_y) of the Y-axis acceleration data with respect to a tilted plated.

Figure 10A:
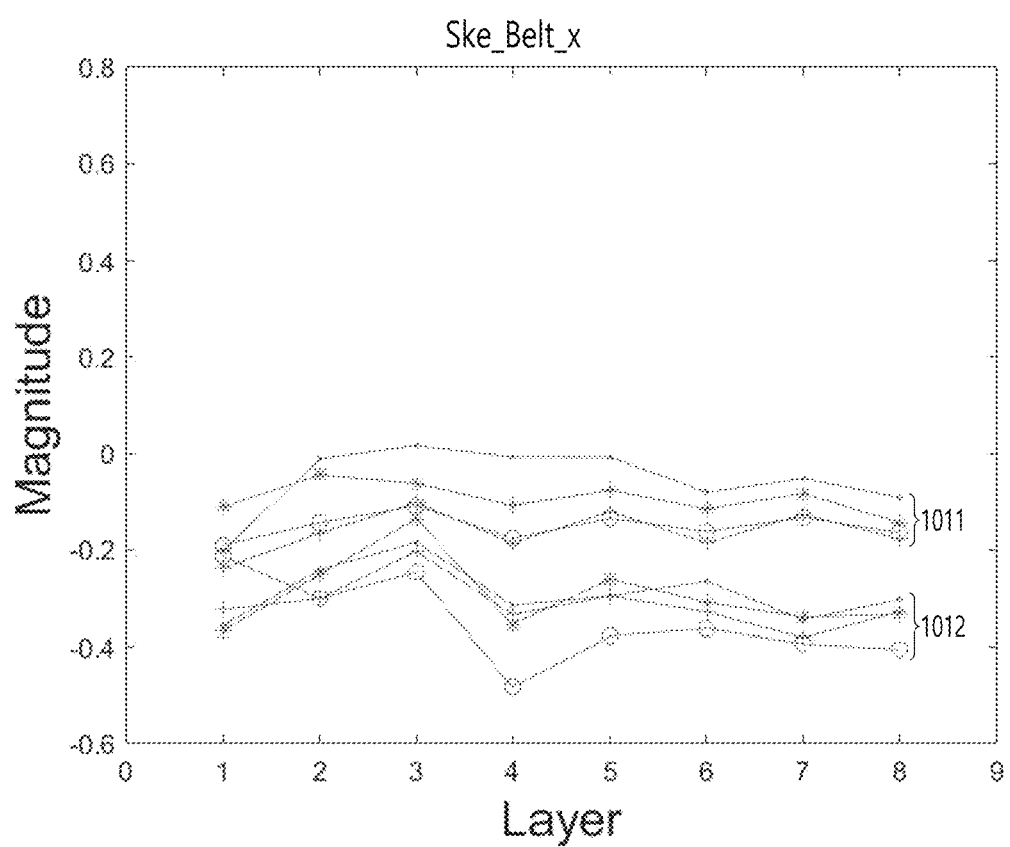

FIG. 10A illustrates the skewness feature element (SKe_Belt_x) of the X-axis acceleration data with respect to a loose belt.

Figure 10B:
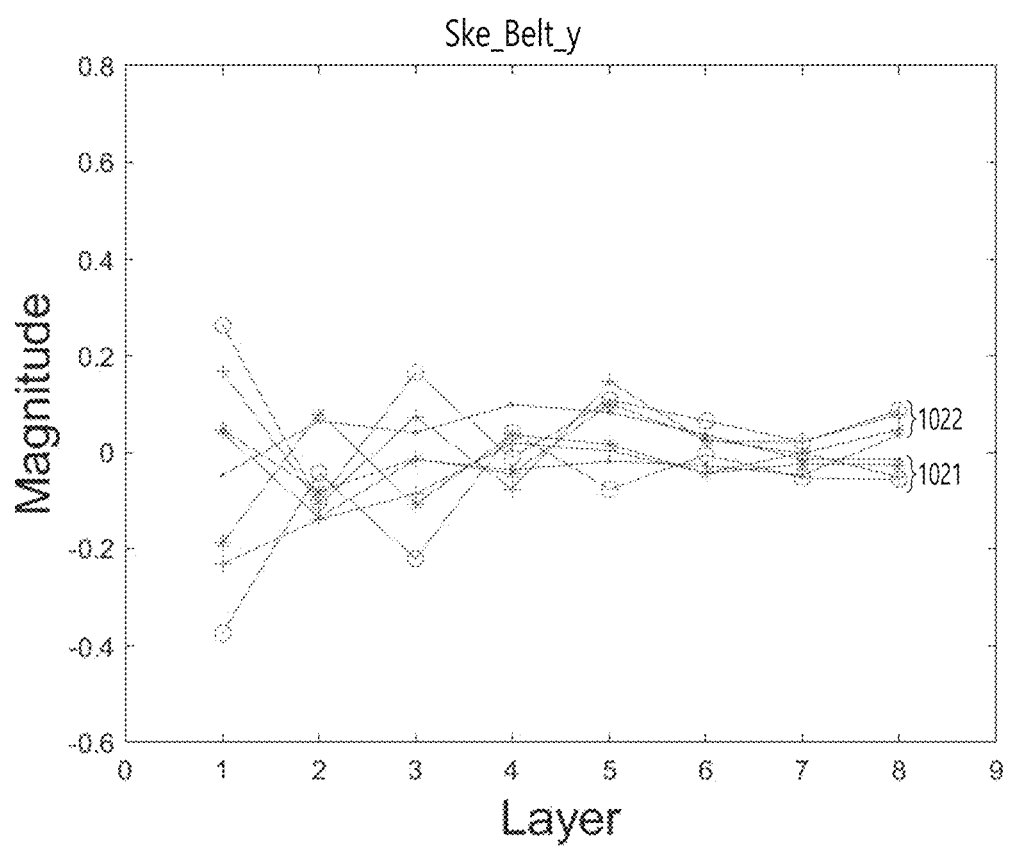

FIG. 10B illustrates the skewness feature element (Ske_Belt_y) of the Y-axis acceleration data with respect to a loose belt.

Figure 10C:
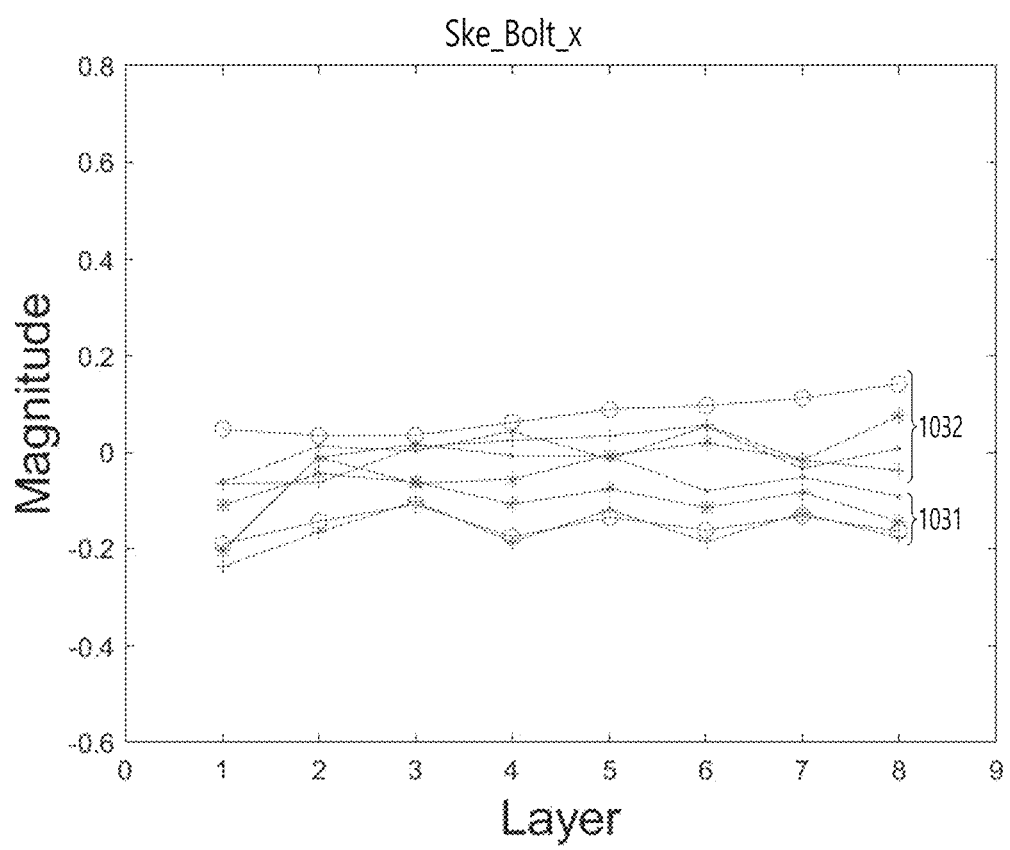

FIG. 10C illustrates the skewness feature element (Ske_Bolt_x) of the X-axis acceleration data with respect to a loosened belt.

Figure 10D:
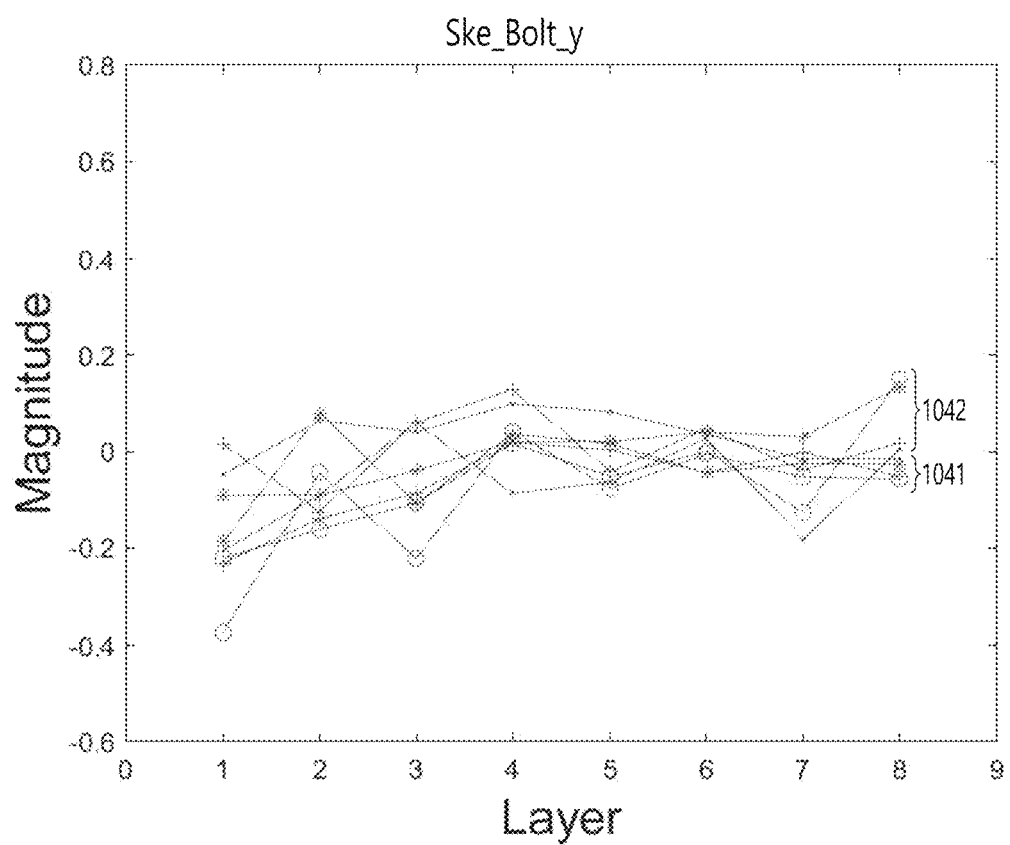

FIG. 10D illustrates the skewness feature element (Ske_Bolt_y) of the Y-axis acceleration data with respect to a loosened belt.

Figure 10E:
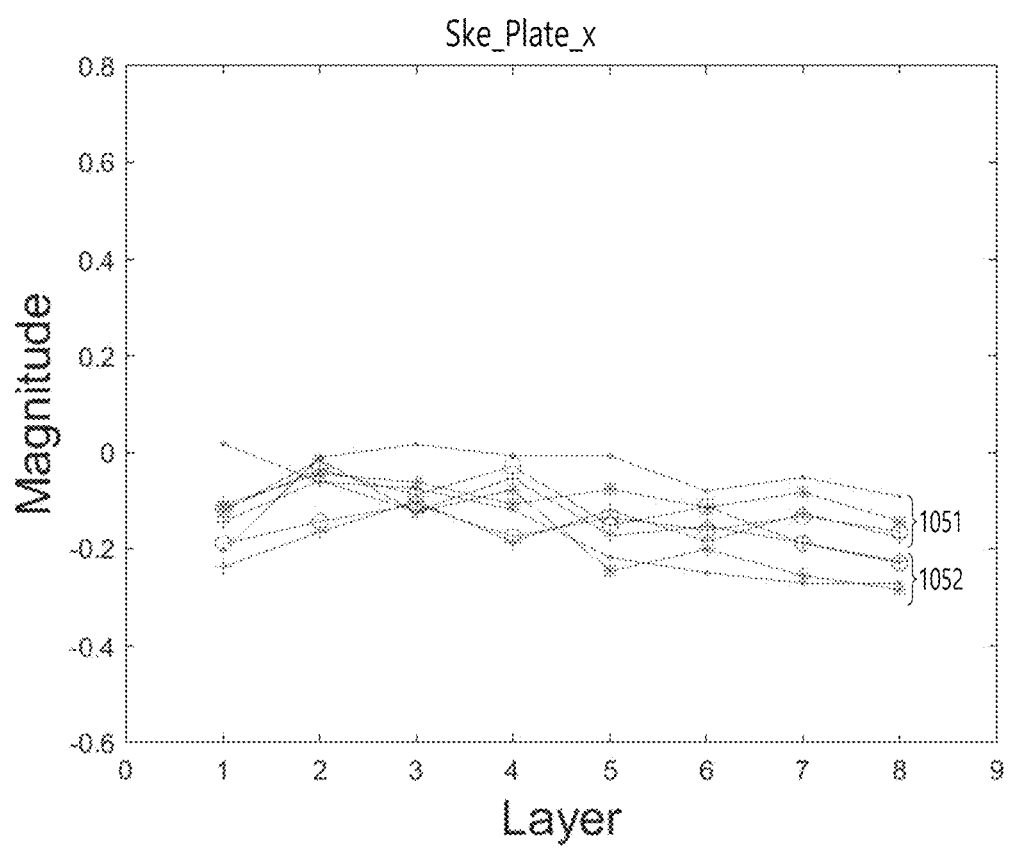

FIG. 10E illustrates the skewness feature element (Ske_Plate_x) of the X-axis acceleration data with respect to a tilted plate.

Figure 10F:
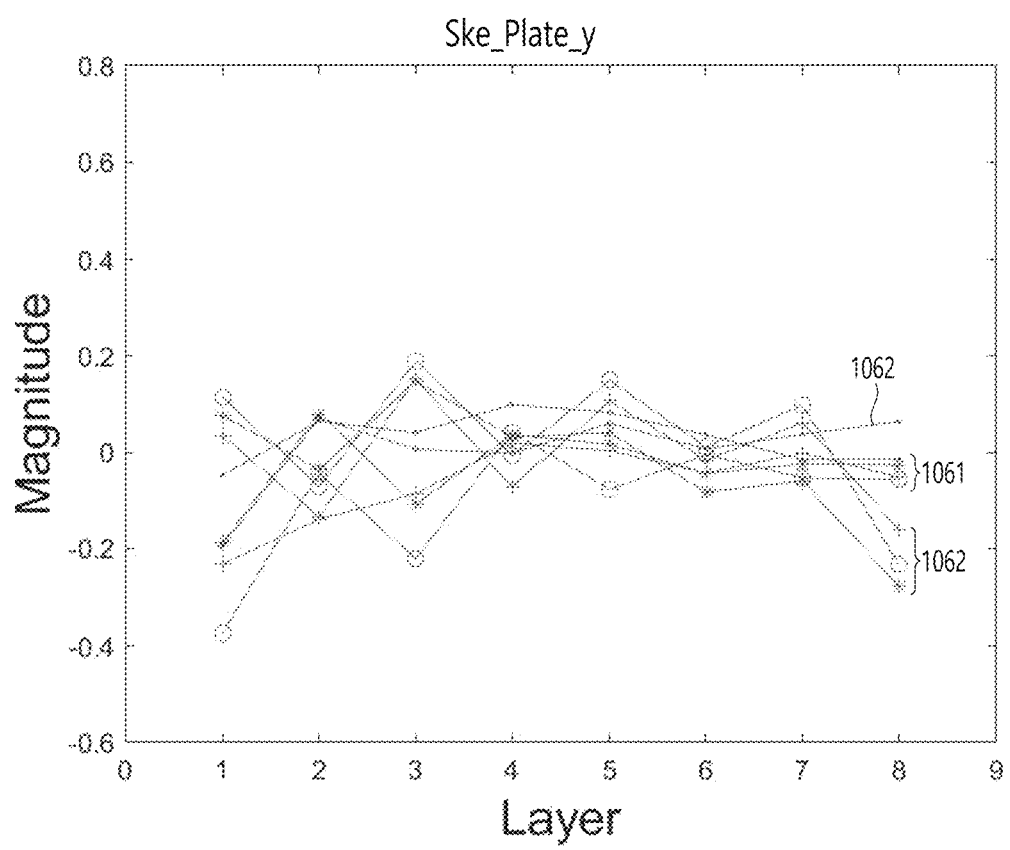

FIG. 10F illustrates the skewness feature element (Ske_Plate_y) of the Y-axis acceleration data with respect to a tilted plated.

As described above, the health state diagnosing apparatus 100 according to one example embodiment of the present invention may collect the X-axis, Y-axis, and Z-axis acceleration data and the acoustic emission data during a 3D printing process from the acceleration sensors and acoustic emission sensor attached to the 3D printer 10; divide the data corresponding to a total of 8 layers, which is the number of deposition layers of an output object, according to the respective layers; and extract the RMS, maximum (MAX), crest factor (CF), variance (V), kurtosis (Kur), and skewness (Ske) feature element for each layer.

Each feature element is regarded as a normal state (blue color) or an abnormal state (red color) depending on the failure of the corresponding equipment component. The abnormal state may include at least one of the states such as a loose belt, loosened bolt, and tilted plate, which are typical examples of a component failure of a 3D printer.

Figure 11:
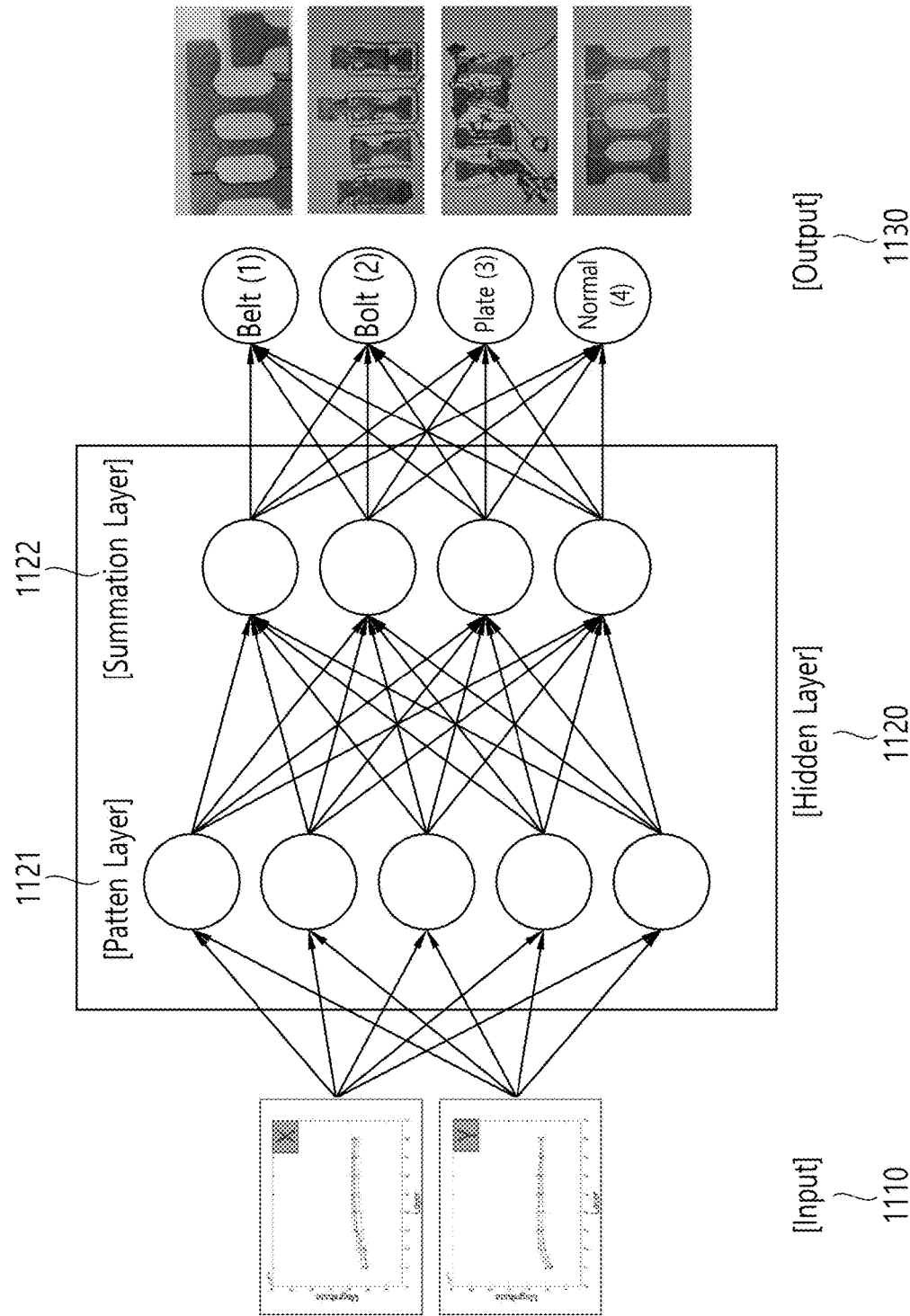
FIG. 11 illustrates an equipment health state diagnosis model based on probabilistic neural network theories used for an apparatus for diagnosing health state of a 3D printer according to one example embodiment of the present invention.

FIG. 11 illustrates an equipment health state diagnosis model based on probabilistic neural network theories used for an apparatus for diagnosing health state of a 3D printer according to one example embodiment of the present invention.

The health state diagnosing apparatus 100 of a 3D printer according to one example embodiment of the present invention constructs an equipment health state diagnosis model to which probabilistic neural network (PNN)-based machine learning theories are applied by using feature elements of effective X-axis and Y-axis acceleration data and performs a health state diagnosis of equipment components of the 3D printer 10.

Here, the equipment health state diagnosis model to which PNN-based machine learning theories have been applied may determine which class an input object belongs to. The equipment health state diagnosis model is constructed by using an algorithm learning from two or more training patterns. The health state diagnosis apparatus 100, through the equipment health state diagnosis model, may calculate a probability of a new input signal to belong to an existing class based on a distance matrix the elements of which represent a distance of the signal to the existing classes and assign the signal based on the calculated probability. Since the probabilistic neural network does not require construction of a neural network through pattern mapping in the hidden layer 1120 and learning of the neural network, uncertainty of a network structure is lowered, and computation time is reduced considerably.

FIG. 11 illustrates a situation in which the RMS feature elements of the X-axis and the Y-axis acceleration data are specified as the input values. However, one example embodiment of the present invention is not limited to a particular feature element, and other feature elements may also be used as input values. The equipment health state diagnosis model employing PNN-based machine learning theories may include an input layer 1110, hidden layer 1120, and output layer 1130. Also, the hidden layer 1120 may include a pattern layer 1121 and a summation layer 1122.

The input layer 1110, which is one type of distributed layer, receives data of which the input pattern is the same as all of the training patterns. Afterwards, the learning layer 1120 calculates an inner product of a weight vector and the input pattern. Next, the learning layer 1120 applies the inner product to a nonlinear activation function and performs nonlinear computations. And the summation layer 1130 sums up the nonlinear output results calculated at the learning layer 1120. Afterwards, the output layer 1140 finally outputs a binary number composed of 0s and 1s to represent whether the input pattern corresponds to a specific training pattern.

As described above, the health state diagnosing apparatus 100 of a 3D printer extracts the characteristic features and diagnoses health state of an equipment component of the 3D printer 10 by using the equipment component health state diagnosis model to which PNN-based machine learning theories have been applied based on the RMS feature elements of the X-axis and the Y-axis acceleration data by which equipment component health state in the normal or abnormal state may be determined.

Now, a result of performing a failure diagnosis on the 3D printer components by using the equipment health state diagnosis model of FIG. 11 will be described.

Input variables are feature elements of the X-axis and the Y-axis acceleration data, and output variables are failure state values of the 3D printer 10; the result shows high diagnostic accuracy as shown in Table 1. For example, as a failure state, a loose belt is denoted as 1; loosened bolt as 2; and tilted plate as 3 while the normal state is denoted as 4.

TABLE 1

| Total amount of data | Determination | Diagnostic error | Diagnostic rate |
| --- | --- | --- | --- |
| 16 | 14 | 2 | 87.5% |

Figure 12:
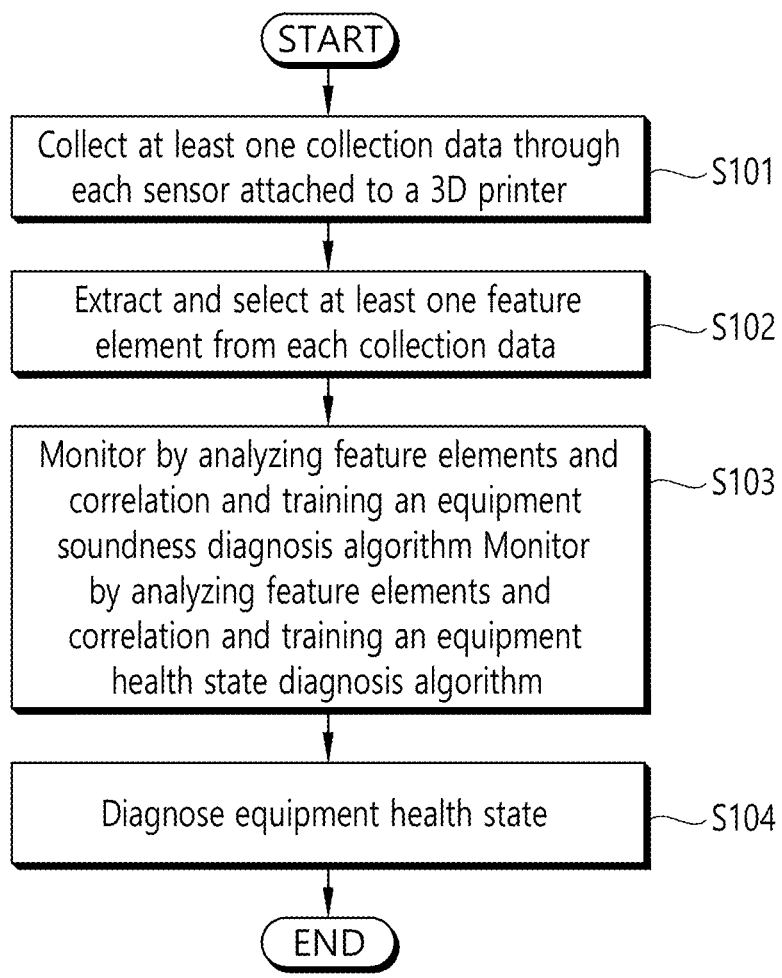
FIG. 12 is a flow diagram for illustrating a method for diagnosing health state of a 3D printer according to one example embodiment of the present invention.

FIG. 12 is a flow diagram for illustrating a method for diagnosing health state of a 3D printer according to one example embodiment of the present invention.

According to one example embodiment of the present invention, the health state diagnosing apparatus 100 may comprise a sensor, memory storing at least one or more instructions, and processor. By executing at least one or more instructions stored in the memory, the processor may perform each step of a method for diagnosing health state of a 3D printer according to one example embodiment of the present invention.

In the S101 step, the health state diagnosing apparatus 100 collects at least one of acceleration data due to a movement of 3D printer components during a 3D printing process and sound data as collection data, through at least one of at least one acceleration sensor (102 to 104) and an acoustic emission sensor 101 attached to the 3D printer 10. The data collecting unit 110 may collect collection data by using wireless communication with at least one of at least one acceleration sensor and the acoustic emission sensor attached to the 3D printer 10. Here, the 3D printer component may include at least one of a plate, belt, and bolt of the 3D printer. At least one acceleration sensor may include at least one acceleration sensor among the X-axis, Y-axis, and Z-axis acceleration sensor.

In the S102 step, by using at least one of the acceleration data and the sound data, the health state diagnosing apparatus 100 extracts at least one feature element among the feature element of the acceleration data and the feature element of the sound data for determining the normal or abnormal state of a 3D printer component. Here, the health state diagnosing apparatus 100 may select a feature element for determining the normal or abnormal state of a 3D printer component among extracted at least one feature element.

In the S103 step, the health state diagnosing apparatus 100 monitors by analyzing the feature elements and the correlation, and trainings an equipment health state diagnosis model. Here, in the training process of the equipment health state diagnosis model, the health state diagnosing apparatus 100 may analyze a correlation between the extracted feature element and a failure state of a 3D printer component and construct a health state diagnosis model based on the analysis result.

In the S104 step, the health state diagnosing apparatus 100 may diagnose health state of a 3D printer component by analyzing a correlation between at least one of the feature elements of acceleration data and the feature elements of the sound data and the normal or abnormal state of the 3D printer component by applying machine learning. Here, the health state diagnosing apparatus 100 uses a trained equipment health state diagnosis model for diagnosing health state of the 3D printer component. As described above, the health state diagnosing apparatus 100 may learn the health state diagnosis model of the 3D printer model, to which machine learning has been applied, and verify the health state diagnosis model of the 3D printer component through the learned health state diagnosis model.

Afterwards, the health state diagnosing apparatus 100 may predict a failure of the 3D printer component by using a health state diagnosis of the 3D printer component.

As described above, a method for diagnosing health state of a 3D printer component according to an embodiment of the present invention may contribute to performing preventative maintenance by predicting a failure of the equipment or components of the 3D printer. By doing so, the method for diagnosing health state of a 3D printer component may also improve quality of an output object. Also, the method for diagnosing health state of a 3D printer component may minimize downtime and improve productivity by extending and applying the method to various industrial sites.

A method for diagnosing health state of a 3D printer component according to embodiments of the present invention described above may be implemented in the form of program codes in a computer-readable recording medium. The method for diagnosing health state of a 3D printer component according to embodiments of the present invention includes a computer-readable storage medium which stores commands which may be executed by a processor, where the commands are configured to make the processor collect, as collection data, at least one of acceleration data due to a movement of the 3D printer component and sound data during a 3D printing process through at least one of at least one acceleration sensor and an acoustic emission sensor attached to the 3D printer; extract at least one feature element among the feature elements of the acceleration data and the feature elements of the sound data for determining a normal or abnormal state of the 3D printer component by using at least one of the acceleration data and the sound data; and analyze a correlation between at least one of the feature element of the acceleration data and the feature element of the sound data and the normal or abnormal state of the 3D printer component by applying a machine learning technique, thereby diagnosing health state of the 3D printer component.

A computer-readable recording medium includes all kinds of recording apparatus which store data that may be read by a computer system. Examples of a computer-readable recording medium include Read Only Memory (ROM), Random Access Memory (RAM), magnetic tape, magnetic disk, flash memory, and optical data storage device. Also, the computer-readable recording medium may be distributed over computer systems connected to each other through a computer communication network so that computer-readable codes may be stored and executed in a distributed manner.

In this document, the present invention has been described with reference to appended drawings and embodiments, but the technical scope of the present invention is not limited to the drawings or embodiments. Rather, it should be understood by those skilled in the art to which the present invention belongs that the present invention may be modified or changed in various ways without departing from the technical principles and scope of the present invention disclosed by the appended claims below.

More specifically, the characteristic features described above may be executed by a digital electronic circuit, computer hardware, firmware, or a combination thereof. The characteristic features may, for example, be executed by a computer program product implemented within a storage apparatus of a machine-readable storage device so that they may be executed by a programmable processor. And the characteristic features may be executed by a programmable processor which executes a program of instructions for performing functions of the aforementioned embodiments as they are operated based on the input data to produce an output. The characteristic features described above may be executed within one or more computer programs which may be executed on a programmable system including at least one programmable processor, at least one input device, and at least one output device, which are combined to receive data and instructions from a data storage system and to transmit data and instructions to the data storage system. A computer program includes a set of instructions which may be used directly or indirectly within the computer to perform a specific operation with respect to a predetermined result. The computer program may be written by any one of programming languages including compiled or interpreted languages and may be used in any other form including a module, element, subroutine, other appropriate unit to be used in a different computing environment, or program which may be manipulated independently.

Processors appropriate for executing a program of instructions include, for example, both of general-purpose and special-purpose microprocessors, single processor, or multiprocessors of a different type of computer. Also, storage devices appropriate for implementing computer program instructions and data which implement the characteristic features described above include all kinds of non-volatile storage devices: for example, semiconductor memory devices such as EPROM, EEPROM, and flash memory devices; internal hard disks; magnetic devices such as removable disks; optical magnetic disks; CD-ROM; and DVD-ROM disks. The processor and memory may be integrated within application-specific integrated circuits (ASICs) or added by the ASICs.

Although the present invention is described based on a series of functional blocks, the present invention is not limited to the embodiments described above and the appended drawings; rather, it should be clearly understood by those skilled in the art to which the present invention belongs that various substitutions, modifications, and variations of the present invention may be made without departing from the technical principles and scope of the present invention.

A combination of the aforementioned embodiments is not limited to the embodiments described above, but depending on implementation and/or needs, not only the aforementioned embodiments but also a combination of various other forms may be provided.

In the embodiments described above, methods are described according to a flow diagram by using a series of steps and blocks. However, the present invention is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present invention.

The embodiments described above include examples of various aspects. Although it is not possible to describe all the possible combinations to illustrate the various aspects, it would be understood by those skilled in the corresponding technical field that various other combinations are possible. Therefore, it may be regarded that the present invention includes all of the other substitutions, modifications, and changes belonging to the technical scope defined by the appended claims.

In this document, the present invention has been described with reference to appended drawings and embodiments, but the technical scope of the present invention is not limited to the drawings or embodiments. Rather, it should be understood by those skilled in the art to which the present invention belongs that the present invention may be modified or changed in various ways without departing from the technical principles and scope of the present invention disclosed by the appended claims below.

Some embodiments of the present invention may diagnose health state of a 3D printer which collects collection data in a 3D printing process by using sensors attached to the 3D printer (for example, an acceleration sensor and an acoustic emission sensor), extracts feature elements of the sensor data, applies machine learning to an equipment health state diagnosis model based on the extracted feature elements, and thereby enables diagnosing equipment health state of 3D printer components in an objective and consistent manner.

Some embodiments of the present invention may accurately diagnose and predict a failure of major components of a 3D printer based on a health state diagnosis result of the 3D printer.

Some embodiments of the present invention may save time and materials consumed for 3D printing by diagnosing health state of 3D printing components or equipment online.

Some embodiments of the present invention may contribute to performing preventative maintenance by predicting a failure of equipment/components of a 3D printer, by which quality of an output may also be improved.

Also, some embodiments of the present invention may minimize downtime through 3D printing process monitoring of a 3D printer subject to health state diagnosis and improve productivity.

Furthermore, some embodiments of the present invention may reduce education costs for workers operating a 3D printer.

What is claimed is:

1. A method for diagnosing health state of a three-dimensional (3D) printer, comprising:
    collecting at least one of acceleration data and sound data due to a movement of a 3D printer component during a 3D printing process as collection data through at least one of at least one acceleration sensor and an acoustic emission sensor attached to the 3D printer;
    extracting at least one feature element among feature elements of the acceleration data and feature elements of the sound data for determining a normal state and an abnormal state of the 3D printer component by using at least one of the acceleration data and the sound data; and diagnosing health state of the 3D printer component by analyzing a correlation between at least one of the feature elements of the acceleration data and the feature elements of the sound data and an abnormal state of the 3D printer component by using machine learning.

2. The method of claim 1, wherein the 3D printer component includes at least one of a plate, belt, and bolt of the 3D printer.

3. The method of claim 1, wherein the at least one acceleration sensor includes at least one acceleration sensor among an X-axis acceleration sensor, Y-axis acceleration sensor, and Z-axis acceleration sensor.

4. The method of claim 1, wherein the feature element of the acceleration data includes a feature element of at least one acceleration data among a feature element of X-axis acceleration data, feature element of Y-axis acceleration data, and feature element of Z-axis acceleration data.

5. The method of claim 1, further comprising
defining at least one acceleration data among a feature element of X-axis acceleration data, feature element of Y-axis acceleration data, and feature element of Z-axis acceleration data into a case of a normal state and a case of an abnormal state of the 3D printer component.

6. The method of claim 1, wherein the abnormal state includes at least one abnormal state among a loose belt, loosened bolt, and tilted plate.

7. The method of claim 1, wherein the feature element includes at least one of root mean square (RMS), maximum, crest factor, variance, kurtosis, and skewness feature element.

8. The method of claim 1, wherein the collecting at least one as collection data collects collection data by using wireless communication with at least one of at least one acceleration sensor and an acoustic emission sensor attached to the 3D printer.

9. The method of claim 1, wherein the extracting at least one feature element extracts at least one feature element between the feature element of the acceleration data and the feature element of the sound data by dividing collection data corresponding to a deposition layer number of an output object of the 3D printer according to the respective layers.

10. The method of claim 1, further comprising
predicting a failure of the 3D printer component by using a health state diagnosis result of the 3D printer component.

11. An apparatus for diagnosing health state of a 3D printer, comprising:
a data collecting unit collecting at least one of acceleration data and sound data due to a movement of a 3D printer component during a 3D printing process as collection data through at least one of at least one acceleration sensor and an acoustic emission sensor attached to the 3D printer;

a feature element extracting unit extracting at least one feature element among feature elements of the acceleration data and feature elements of the sound data for determining a normal state and an abnormal state of the 3D printer component by using at least one of the acceleration data and the sound data; and a health state diagnosing unit diagnosing health state of the 3D printer component by analyzing a correlation between at least one of the feature elements of the acceleration data and the feature elements of the sound data and an abnormal state of the 3D printer component by using machine learning.

12. The apparatus of claim 11, wherein the 3D printer component includes at least one of a plate, belt, and bolt of the 3D printer.

13. The apparatus of claim 11, wherein the at least one acceleration sensor includes at least one acceleration sensor among an X-axis acceleration sensor, Y-axis acceleration sensor, and Z-axis acceleration sensor.

14. The apparatus of claim 11, wherein the feature element of the acceleration data includes a feature element of at least one acceleration data among a feature element of X-axis acceleration data, feature element of Y-axis acceleration data, and feature element of Z-axis acceleration data.

15. The apparatus of claim 11, further comprising
defining at least one acceleration data among a feature element of X-axis acceleration data, feature element of Y-axis acceleration data, and feature element of Z-axis acceleration data into a case of a normal state and a case of an abnormal state of the 3D printer component.

16. The apparatus of claim 11, wherein the abnormal state includes at least one abnormal state among a loose belt, loosened bolt, and tilted plate.

17. The apparatus of claim 11, wherein the feature element includes at least one or more of root mean square (RMS), maximum, crest factor, variance, kurtosis, and skewness feature element.

18. The apparatus of claim 11, wherein the data collecting unit collects collection data by using wireless communication with at least one of at least one acceleration sensor and an acoustic emission sensor attached to the 3D printer.

19. The apparatus of claim 11, wherein the feature element extracting unit extracts at least one feature element between the feature element of the acceleration data and the feature element of the sound data by dividing collection data corresponding to a deposition layer number of an output object of the 3D printer according to the respective layers.

20. The apparatus of claim 11, wherein the health state diagnosing unit predicts a failure of the 3D printer component by using a health state diagnosis result of the 3D printer component.

* * * * *